(12) United States Patent
Maeda et al.

(10) Patent No.: US 11,681,260 B2
(45) Date of Patent: Jun. 20, 2023

(54) ELECTRONIC WATCH

(71) Applicant: CITIZEN WATCH CO., LTD., Tokyo (JP)

(72) Inventors: Toshinari Maeda, Tokorozawa (JP); Shogo Kimura, Tokyo (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 937 days.

(21) Appl. No.: 16/562,765

(22) Filed: Sep. 6, 2019

(65) Prior Publication Data

US 2020/0081404 A1 Mar. 12, 2020

(30) Foreign Application Priority Data

Sep. 10, 2018 (JP) .............. JP2018-168464
Jun. 20, 2019 (JP) .............. JP2019-114248

(51) Int. Cl.

| G04C 3/14 | (2006.01) |
|---|---|
| G04G 19/12 | (2006.01) |
| G04C 10/00 | (2006.01) |
| H02P 29/40 | (2016.01) |
| H02K 1/22 | (2006.01) |
| H02N 1/00 | (2006.01) |

(52) U.S. Cl.
CPC .............. *G04G 19/12* (2013.01); *G04C 3/14* (2013.01); *G04C 10/00* (2013.01); *H02K 1/22* (2013.01); *H02N 1/002* (2013.01); *H02P 29/40* (2016.02)

(58) Field of Classification Search
CPC . G04G 19/12; G04C 3/14; G04C 3/16; G04C 1/04; G04C 10/00; H02P 29/40; H02K 1/22; H02N 1/002
See application file for complete search history.

(56) References Cited

U.S. PATENT DOCUMENTS

| 3,629,624 A | * | 12/1971 | Staudte | .................... | G04C 3/16 |
| | | | | | 318/116 |
| 3,696,258 A | * | 10/1972 | Anderson | .............. | H02N 1/004 |
| | | | | | 55/DIG. 39 |
| 6,320,822 B1 | | 11/2001 | Okeya et al. | | |

(Continued)

FOREIGN PATENT DOCUMENTS

| JP | 5461604 A | 5/1979 |
| JP | 04-112683 A | 4/1992 |
| JP | 3484704 B2 | 1/2004 |

OTHER PUBLICATIONS

Office Action dated Apr. 5, 2022 issued by the Japanese Patent Office in Japanese Application No. 2018168464.

*Primary Examiner* — Sean Kayes

(74) *Attorney, Agent, or Firm* — Sughrue Mion, PLLC

(57) ABSTRACT

An electronic watch includes a power source, an electrostatic motor including a rotor in which a plurality of electret films are arranged in a rotational direction and a plurality of fixed electrodes arranged in the rotational direction at positions facing the rotor, a hand rotating in conjunction with the rotation of the rotor, and a motor control circuit controlling the electrostatic motor. The motor control circuit selectively executes a hand movement mode for rotating the hand and a stop mode for keeping the hand stationary. In the stop mode, the motor control circuit keeps the rotor stationary through electrostatic forces exerted on the electret films from the fixed electrodes with the polarities of the fixed electrodes maintained.

11 Claims, 25 Drawing Sheets

(56) References Cited

U.S. PATENT DOCUMENTS

| | | | |
|---|---|---|---|
| 2010/0085843 A1* | 4/2010 | Bisig | G04C 3/08 |
| | | | 310/309 |
| 2016/0004223 A1* | 1/2016 | Willemin | G04C 1/028 |
| | | | 368/207 |
| 2017/0019035 A1* | 1/2017 | Matsumoto | G04C 10/00 |
| 2017/0277140 A1* | 9/2017 | Akiyama | G04R 20/02 |

* cited by examiner

FIG.23

| INTERNAL TIME | DISPLAY TIME | DIFFERENCE BETWEEN TIMES | |
|---|---|---|---|
| | | | STOP MODE |
| 11:30:30 | 11:30:00 | | |
| 11:30:31 | 11:30:00 | | ←RETURN CONDITION IS SATISFIED |
| 11:30:59 | 11:30:14 | 45 SECONDS BEHIND | RETURN CONTROL |
| 11:31:00 | 11:31:15 | 15 SECONDS AHEAD | |
| 11:31:30 | 11:31:30 | TIMES MATCH | HAND MOVEMENT MODE |

FIG.26

| INTERNAL TIME | DISPLAY TIME | DIFFERENCE BETWEEN TIMES | |
|---|---|---|---|
| | | | STOP MODE |
| 11:30:30 | 11:30:00 | 30 SECONDS BEHIND | ←CANCEL LOW POWER CONSUMPTION MODE |
| 11:30:32 | 11:30:59 | | |
| | | | RETURN CONTROL (BACKWARD ROTATION) |
| 11:30:40 | 11:30:55 | 15 SECONDS AHEAD | |
| 11:30:50 | 11:30:50 | TIMES MATCH | HAND MOVEMENT MODE |

ELECTRONIC WATCH

CROSS-REFERENCE TO RELATED APPLICATION(S)

The present application claims priority to and incorporates by reference the entire contents of Japanese Patent Application No. 2018-168464 filed in Japan on Sep. 10, 2018 and Japanese Patent Application No. 2019-114248 filed in Japan on Jun. 20, 2019.

BACKGROUND OF THE INVENTION

1. Field of the Invention

The present invention relates to an electronic watch.

2. Description of the Related Art

Conventionally, there have been techniques that stop hand movement in electronic watches. Japanese Patent No. 3484704 discloses a technique of an electronic device that sets a power-saving mode reducing power consumption and a display mode performing normal time display in a switchable manner. The power-saving mode of Japanese Patent No. 3484704 is an operating mode that stops drive of a stepping motor to stop hand movement.

By the way, an electrostatic motor including an electrostatic actuator is a mechanism driving hands in electronic watches. Japanese Patent Application Laid-open No. H04-112683 describes an example of the electrostatic actuator, for example.

When a hand is stopped in an electronic watch, the stopping position of the hand is preferably maintained. Apart from that, it is desirable to be able to reduce power consumption for maintaining the stopping position of the hand. When a stepping motor like the one described in Japanese Patent No. 3484704 is used, no drive signal is applied to the stepping motor while power consumption is reduced, and power consumption can be reduced. However, when an electrostatic motor as a mechanism driving the hand is mounted on the electronic watch, if no drive signal is applied like Japanese Patent No. 3484704, a holding force through which the electrostatic motor attempts to stay at its position is small, and the position of the hand deviates by an impact acting on the electronic watch or the like while power consumption is reduced.

SUMMARY OF THE INVENTION

It is an object of the present invention to provide an electronic watch capable of keeping hands stationary while reducing power consumption.

An electronic watch according to one aspect of the present invention includes a power source; an electrostatic motor including a rotor in which a plurality of electret films are arranged in a rotational direction and a plurality of fixed electrodes arranged in the rotational direction at positions facing the rotor; a hand configured to rotate in conjunction with rotation of the rotor; and a motor control circuit configured to control the electrostatic motor, wherein the motor control circuit selectively executes a hand movement mode for rotating the hand and a stop mode for keeping the hand stationary, and in the stop mode, the motor control circuit keeps the rotor stationary through electrostatic forces exerted on the electret films from the fixed electrodes with polarities of the fixed electrodes maintained.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 23 is a diagram of changes in an internal time and a display time in the return control of the third embodiment;

FIG. 26 is a diagram of changes in the internal time and the display time in the return control of the third embodiment;

DETAILED DESCRIPTION OF THE PREFERRED EMBODIMENTS

The following describes an electronic watch according to embodiments of the present invention in detail with reference to the accompanying drawings. These embodiments do not limit the present invention. Components in the following embodiments include ones that those skilled in the art can easily imagine or substantially the same ones.

First Embodiment

Figure 1:
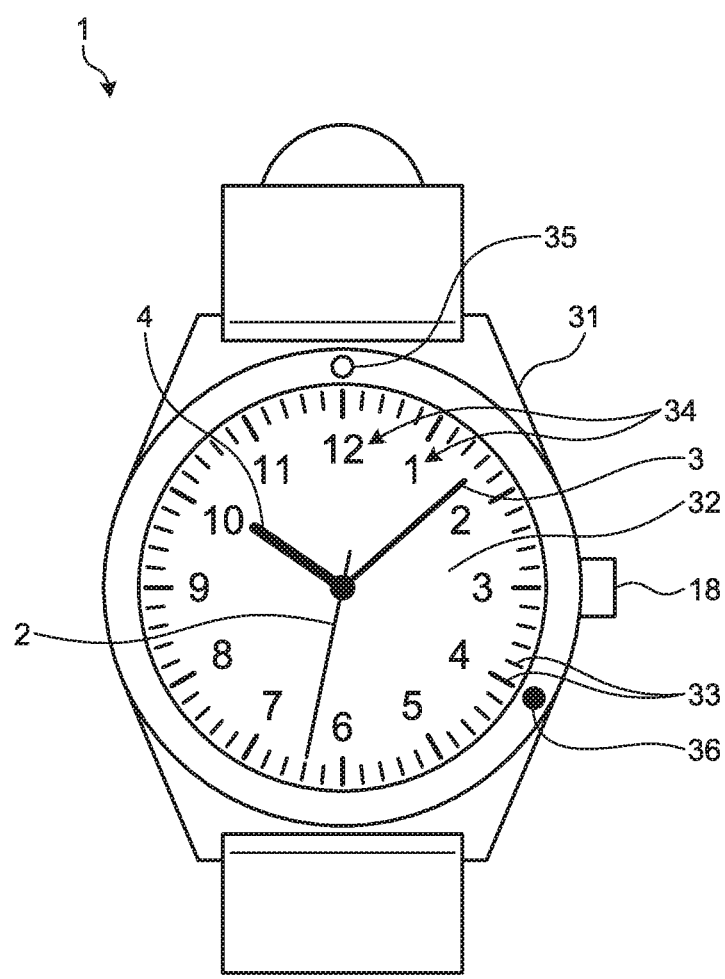
FIG. 1 is a front view of an electronic watch according to a first embodiment.
Figure 2:
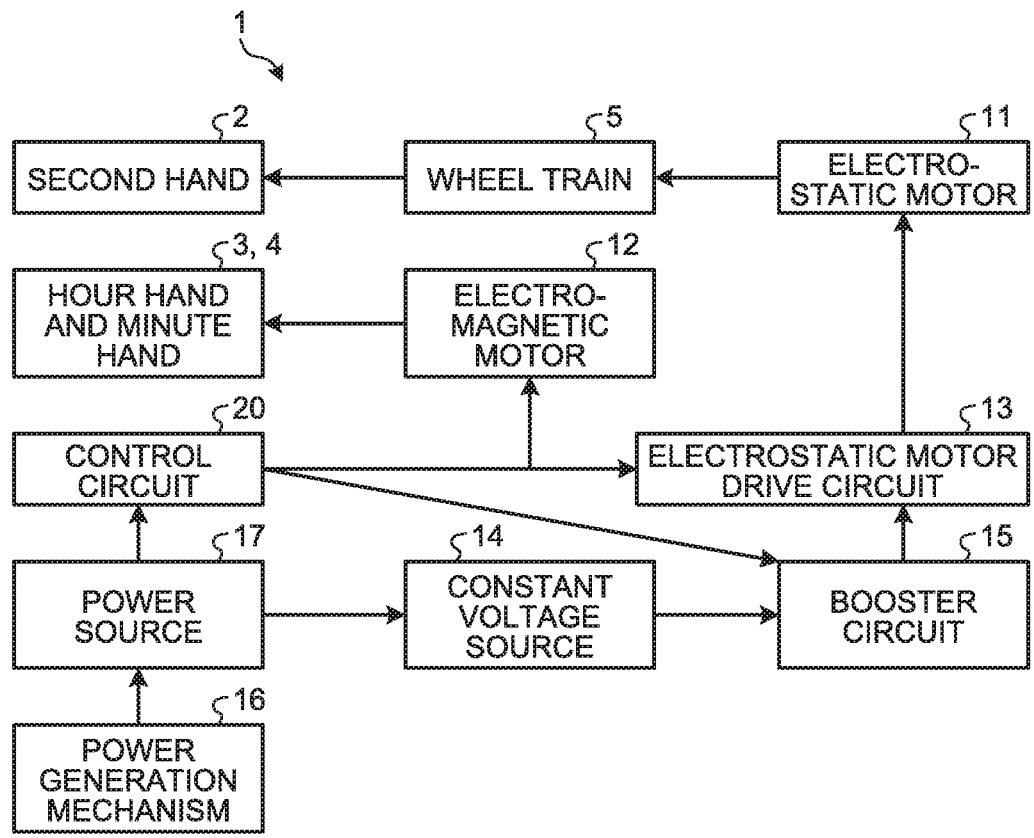
FIG. 2 is a block diagram of the electronic watch according to the first embodiment.
Figure 3:
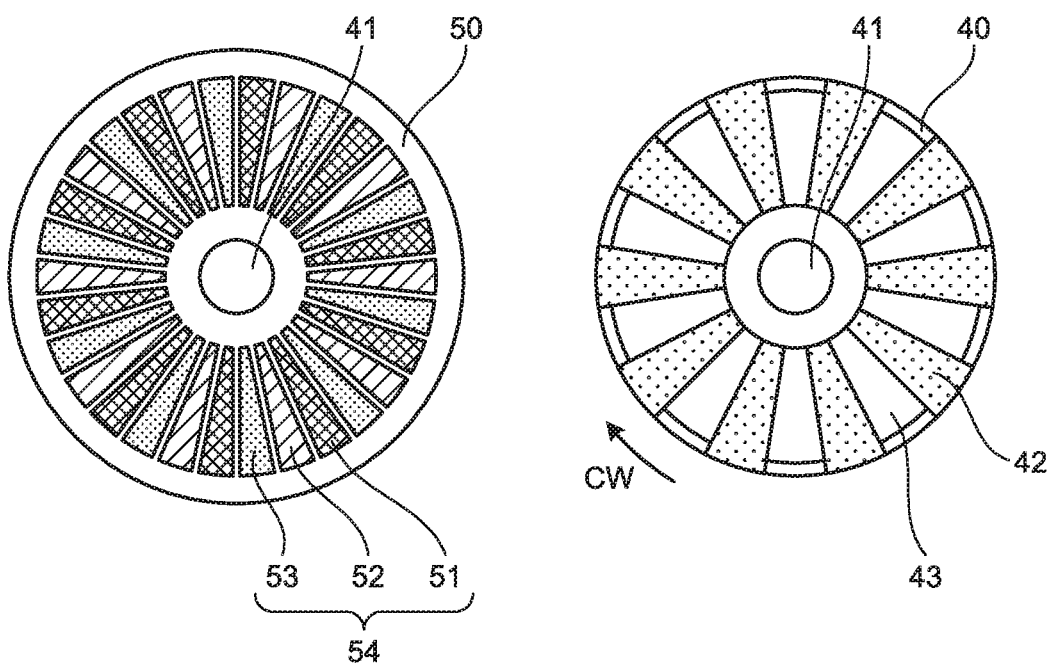
FIG. 3 is a schematic configuration diagram of an electrostatic motor according to the first embodiment.
Figure 4:
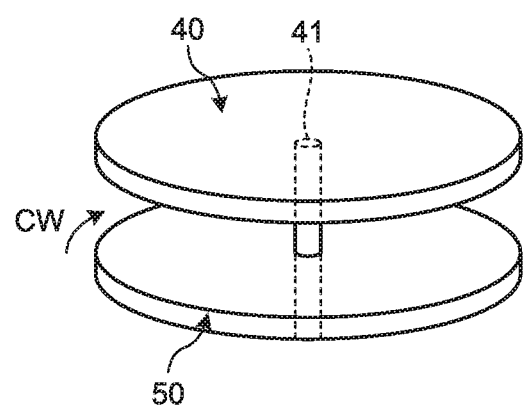
FIG. 4 is a schematic perspective view of the electrostatic motor according to the first embodiment.
Figure 5:
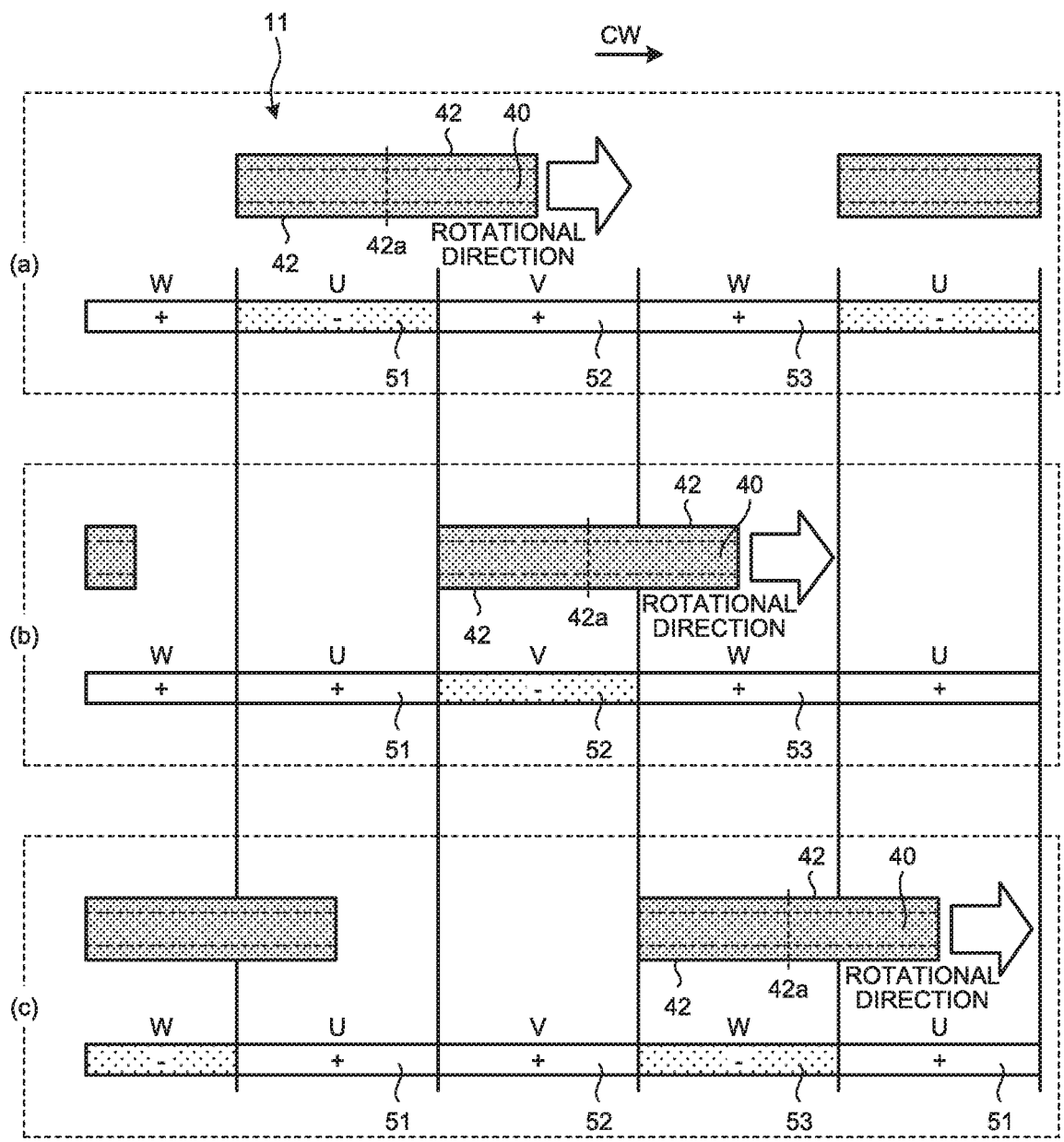
FIG. 5 is a diagram of an example of hand movement control.
Figure 6:
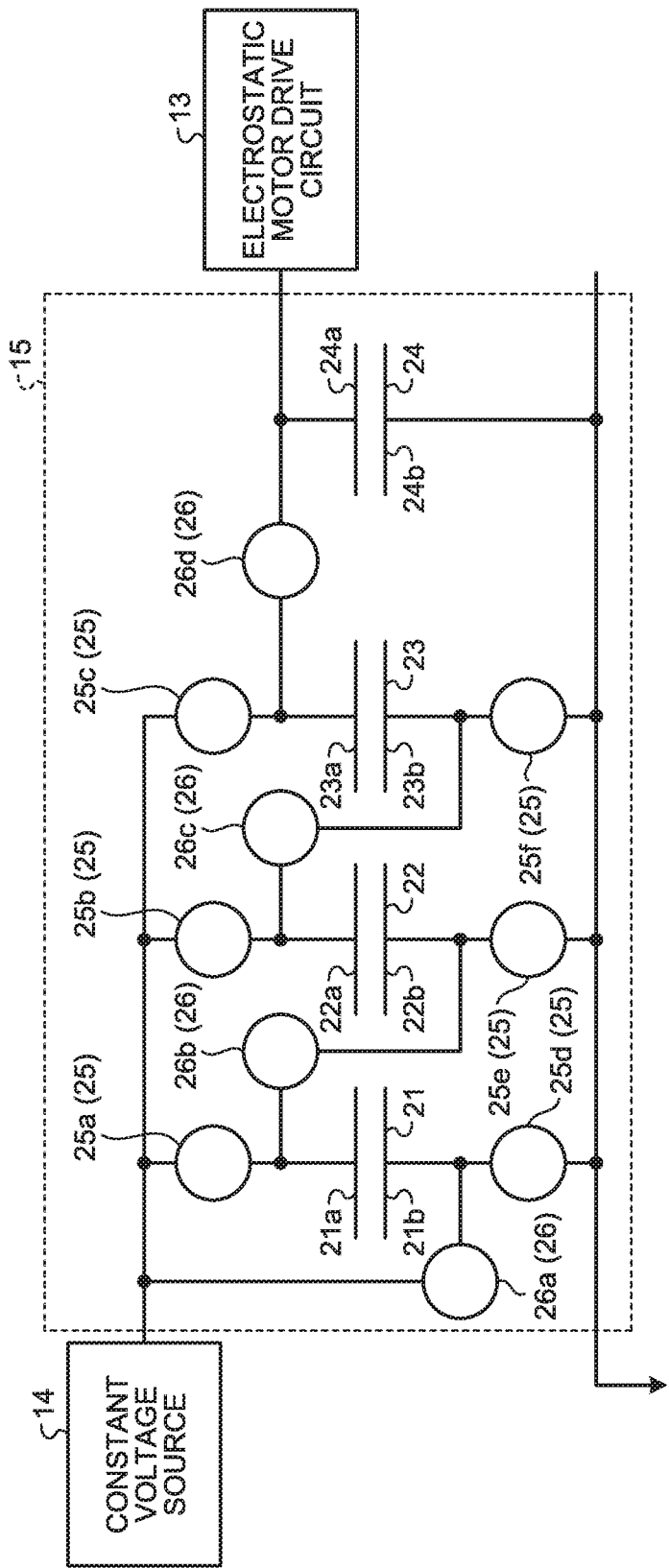
FIG. 6 is a diagram of a booster circuit according to the first embodiment.
Figure 7:
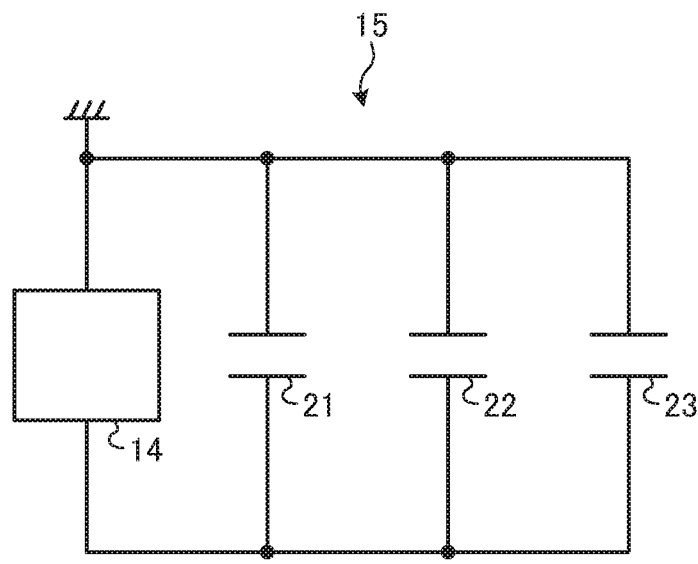
FIG. 7 is a diagram of a first state of the booster circuit.
Figure 8:
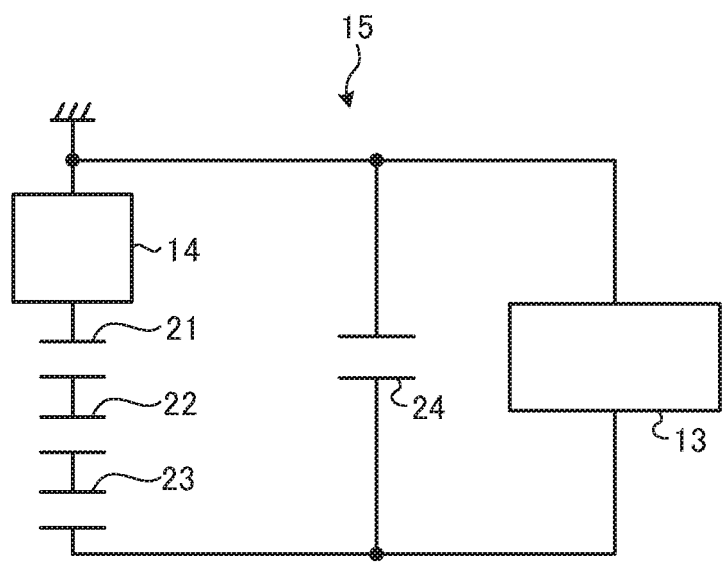
FIG. 8 is a diagram of a second state of the booster circuit.
Figure 9:
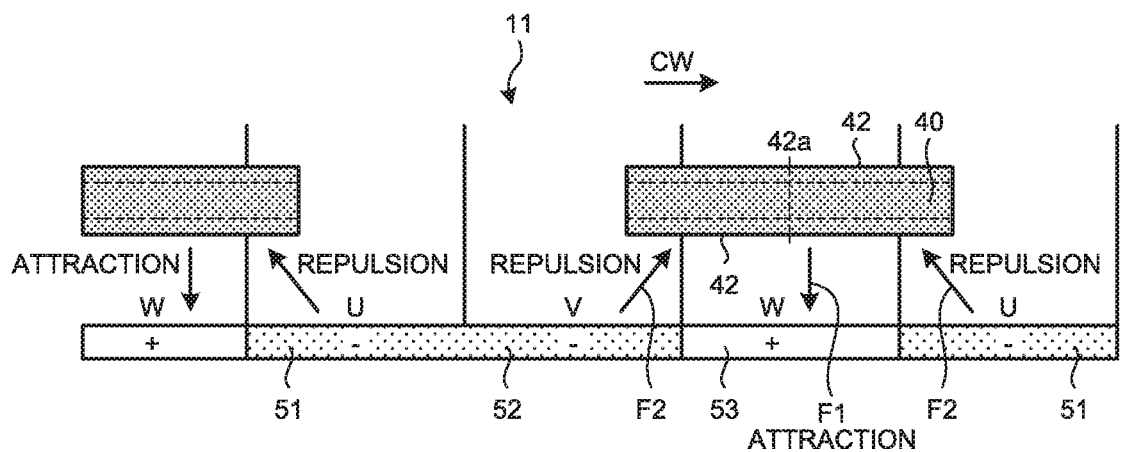
FIG. 9 is a diagram illustrating a stop mode according to the first embodiment.
Figure 10:
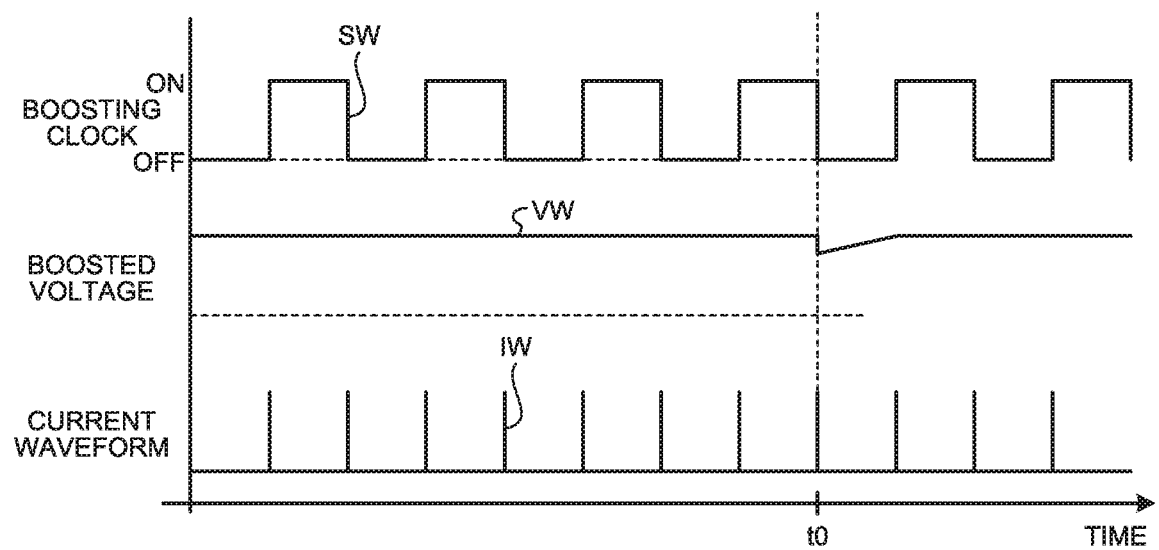
FIG. 10 is a diagram illustrating power consumption in the booster circuit when the electrostatic motor is operated.
Figure 11:
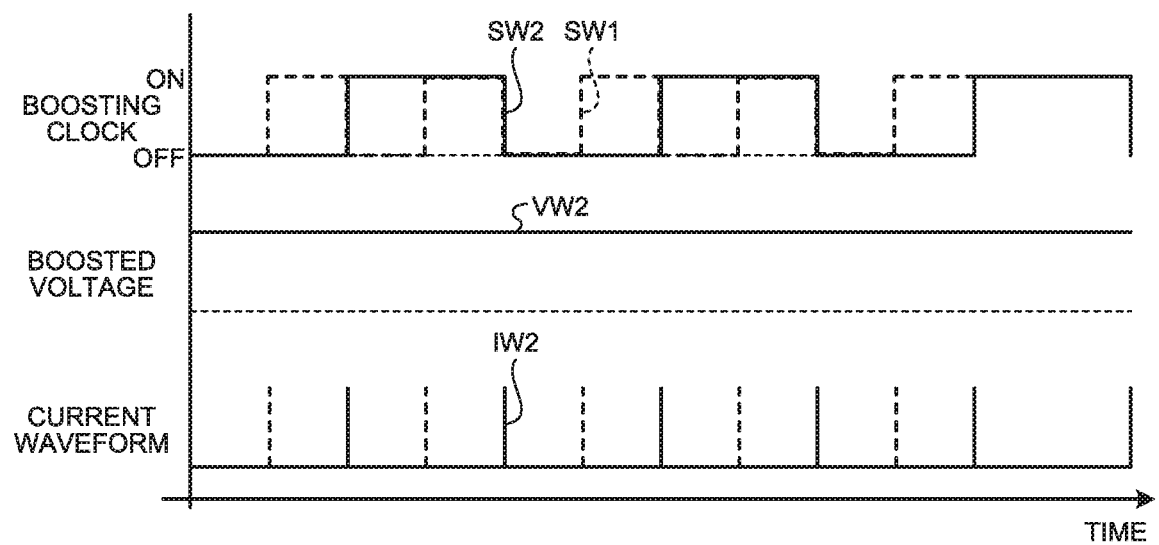
FIG. 11 is a time chart according to a stop mode of the first embodiment.
Figure 12:
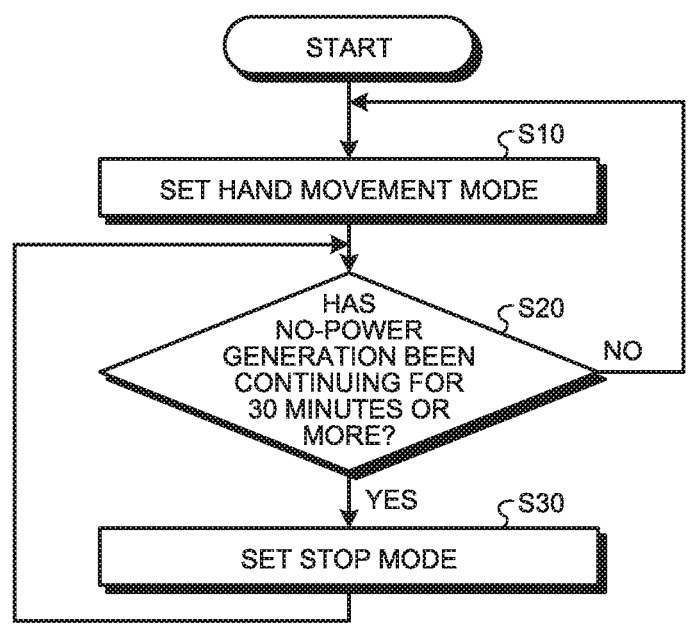
FIG. 12 is a flowchart of operation of the first embodiment.

The following describes a first embodiment with reference to FIG. 1 to FIG. 12. The present embodiment relates to an electronic watch. FIG. 1 is a front view of the electronic watch according to the first embodiment, FIG. 2 is a block diagram of the electronic watch according to the first embodiment, FIG. 3 is a schematic configuration diagram of an electrostatic motor according to the first embodiment, FIG. 4 is a schematic perspective view of the electrostatic motor according to the first embodiment, FIG. 5 is a diagram of an example of hand movement control, FIG. 6 is a diagram of a booster circuit according to the first embodiment, FIG. 7 is a diagram of a first state of the booster circuit, FIG. 8 is a diagram of a second state of the booster circuit, FIG. 9 is a diagram illustrating a stop mode according to the first embodiment, FIG. 10 is a diagram illustrating power consumption in the booster circuit, FIG. 11 is a time chart according to the stop mode of the first embodiment, and FIG. 12 is a flowchart of operation of the first embodiment.

As illustrated in FIG. 1, this electronic watch 1 of the present embodiment is an analog electronic watch displaying a time by a second hand 2, a minute hand 3, and an hour hand 4. The electronic watch 1 has an exterior case 31, a dial plate 32, the second hand 2, the minute hand 3, the hour hand 4, and an operating part 18. The electronic watch 1 of the present embodiment is a watch worn on an arm of a user. The electronic watch 1 displays the current time by three hands (the second hand 2, the minute hand 3, and the hour hand 4).

The dial plate 32 has scales 33 and hour letters 34. The scales 33 are indicators indicated by the hands. The scales 33 are arranged at certain intervals in a circumferential direction on an outer rim of the dial plate 32. The hour letters 34 are figures indicating a time corresponding to each of the scales 33. The operating part 18 is an operation input part operated by the user. The operating part 18 of the present embodiment is a crown.

The exterior case 31 is provided with a power-saving display 35 and a charge warning display 36. The power-saving display 35 is a letter or symbol displaying that a mode of the electronic watch 1 is the stop mode. As described below, the electronic watch 1 presents that the current mode is the stop mode to the user by causing the second hand 2 to indicate the power-saving display 35. The power-saving display 35 of the present embodiment is placed at the 12 o'clock position. As described below, in the electronic watch 1, when it is in a charge warning state, the second hand 2 indicates the charge warning display 36. The charge warning display 36 of the present embodiment is placed at the 4 o'clock position. The power-saving display 35 and the charge warning display 36 may be provided on the dial plate 32.

As illustrated in FIG. 2, the electronic watch 1 further has a wheel train 5, an electrostatic motor 11, an electromagnetic motor 12, an electrostatic motor drive circuit 13, a constant voltage source 14, a booster circuit 15, a power generation mechanism 16, a power source 17, and a control circuit 20.

The wheel train 5 is interposed between the electrostatic motor 11 and the second hand 2. The wheel train 5 is a reduction wheel train having at least one gear and transmits a rotary force generated by the electrostatic motor 11 to the second hand 2. The wheel train 5 is placed on the back side of the dial plate 32. The wheel train 5 changes the speed of the rotation of a rotational shaft of the electrostatic motor 11 with a certain reduction ratio and transmits the rotation to the second hand 2.

The electrostatic motor 11 is an electret motor including an electret as an electrostatic material and rotatingly drives a rotor using electrostatic interaction between electret films and fixed electrodes. The details of the configuration of the electrostatic motor 11 will be described below. The electrostatic motor drive circuit 13 is a circuit controlling a drive current for the electrostatic motor 11.

The electromagnetic motor 12 is a motor using electromagnetic induction and is a stepping motor, for example. The electromagnetic motor 12 rotates the minute hand 3 and the hour hand 4 by intermittent drive repeating a drive state and a suspension holding state. The electromagnetic motor 12 is coupled to the minute hand 3 and the hour hand 4 via a reduction gear train, for example. The electromagnetic motor 12 moves the minute hand 3 and the hour hand 4.

The power source 17 supplies driving electric power to the electrostatic motor 11 and the electromagnetic motor 12. The power source 17 of the present embodiment is a secondary battery. The output voltage of the power source 17 of the present invention is low voltage, which is 2 to 3 [V], for example. The power generation mechanism 16 is connected to the power source 17. The power source 17 stores electricity by electric power generated by the power generation mechanism 16. The power generation mechanism 16 of the present embodiment is an electrostatic induction type power generation mechanism. The power generation mechanism 16 converts rotational energy of a rotor rotating by movement of the arm on which the electronic watch 1 is worn or the like into electric energy. It is understood that mechanisms that may be used as the power generation mechanism 16 include a solar power generation mechanism, an electromagnetic power generation mechanism, a thermal power generation mechanism, and electrostatic induction power generation.

The constant voltage source 14 is provided between the power source 17 and the booster circuit 15. The constant voltage source 14 reduces the output voltage of the power source 17 to a certain voltage set in advance and supplies the voltage to the booster circuit 15. The constant voltage source 14 can maintain the input voltage of the booster circuit 15 constant even when the output voltage of the power source 17 fluctuates. The constant voltage source 14 may be absent.

The booster circuit 15 boosts the voltage input from the constant voltage source 14 and supplies the voltage to the electrostatic motor drive circuit 13. The booster circuit 15 of the present embodiment boosts the voltage with a certain ratio. The details of the booster circuit 15 will be described below. When the constant voltage source 14 is absent, the power source 17 fluctuates in voltage like a secondary battery or the like, and a plurality of boosting ratios may be prepared, in which the boosting ratios may be switched so as to make the voltage of the rear stage of the booster circuit 15 substantially the same.

The electrostatic motor drive circuit 13 is a circuit driving the electrostatic motor 11 by electric power supplied via the booster circuit 15. The electrostatic motor drive circuit 13 is interposed between the booster circuit 15 and the electrostatic motor 11.

The control circuit 20 is a circuit controlling the electrostatic motor 11, the electromagnetic motor 12, and the booster circuit 15. That is to say, the control circuit 20 of the present embodiment has the function of a motor control circuit controlling the electrostatic motor 11 and the function of a voltage control circuit controlling the booster circuit 15.

As illustrated in FIG. 3 and FIG. 4, the electrostatic motor 11 includes a rotor 40, a rotational shaft 41, and a stator 50. The rotor 40 and the stator 50 of the present embodiment are each of a disc shape; the stator 50 is not limited to be of a disc shape and may be of a rectangular shape or the like. The stator 50 of the present embodiment is fixed to a casing or the like in a nonrotatable manner. The rotational shaft 41 is fixed to the rotor 40. The rotational shaft 41 is rotatably supported by a casing or the like. The rotor 40 faces the stator 50 concentrically and spaced apart from the stator 50.

The rotor 40 is a disc-shaped member formed of a substrate material such as a silicon substrate, a glass epoxy substrate provided with a charging electrode face, or an aluminum plate. In the rotor 40, a face facing the stator 50 is formed with a plurality of electret films 42. The electret films 42 are arranged at regular intervals in a rotational direction about the rotational shaft 41. The electret films 42 are thin films formed of an electret material. The electret films 42 of the present embodiment are charged with minus potential. The rotor 40 is formed with through holes 43 between adjacent electret films 42.

In the stator 50, on a face facing the rotor 40, a plurality of fixed electrodes 51, 52, and 53 are arranged. The electrostatic motor 11 of the present embodiment is a three-phase, or a U phase, a V phase, and a W phase, motor. The fixed electrodes 51 are electrodes corresponding to the U phase and will be referred to as "first electrodes 51" in the following description. The fixed electrodes 52 are electrodes corresponding to the V phase and will be referred to as "second electrodes 52" in the following description. The fixed electrodes 53 are electrodes corresponding to the W phase and will be referred to as "third electrodes 53" in the following description. The first electrodes 51, the second electrodes 52, and the third electrodes 53 are arranged at regular intervals in the rotational direction of the rotor 40.

A plurality of electrode groups 54 each including a first electrode 51, a second electrode 52, and a third electrode 53 are arranged on the stator 50. The electrode groups 54 are arranged at regular intervals in the rotational direction of the rotor 40.

The first electrodes 51 are electrically connected to the electrostatic motor drive circuit 13 via common first wiring. That is to say, a common drive pulse is input to the first electrodes 51. Similarly, the second electrodes 52 are electrically connected to the electrostatic motor drive circuit 13 via common second wiring, and the third electrodes 53 are electrically connected to the electrostatic motor drive circuit 13 via common third wiring. Consequently, a common drive pulse is input from the electrostatic motor drive circuit 13 to the second electrodes 52, and a common drive pulse is input from the electrostatic motor drive circuit 13 to the third electrodes 53.

The electrodes 51, 52, and 53 generate attractive forces or repulsive forces between the electrodes and the electret films 42 in accordance with polarities generated by the drive pulses. The electrostatic motor drive circuit 13 rotates the rotor 40 or stops the rotor 40 through electrostatic forces acting on the electret films 42 from the electrodes 51, 52, and 53.

FIG. 5 illustrates an example of control to rotatingly drive the rotor. In a state illustrated in FIG. 5(a), central parts 42a of the electret films 42 face the first electrodes 51. In this case, the electrostatic motor drive circuit 13 makes the first electrodes 51 negative electrodes and makes the second electrodes 52 and the third electrodes 53 positive electrodes. With this configuration, the first electrodes 51 exert electrostatic repulsive forces on the electret films 42, whereas the second electrodes 52 and the third electrodes 53 exert electrostatic attractive forces on the electret films 42. The electrostatic attractive forces act from the second electrodes 52 and the third electrodes 53, which are positioned forward in a rotational direction CW, whereby rotational forces toward the rotational direction CW are imparted to the electret films 42. The electrostatic repulsive forces act from the first electrodes 51, which are positioned rearward in the rotational direction CW, whereby rotational forces toward the rotational direction CW are imparted to the electret films 42.

In a state illustrated in FIG. 5(b), the central parts 42a of the electret films 42 face the second electrodes 52. In this case, the electrostatic motor drive circuit 13 makes the second electrodes 52 negative electrodes and makes the first electrodes 51 and the third electrodes 53 positive electrodes. Through electrostatic attractive forces acting from the first electrodes 51 and the third electrodes 53 on the electret films 42 and electrostatic repulsive forces acting from the second electrodes 52 on the electret films 42, rotational forces toward the rotational direction CW are imparted to the electret films 42.

In a state illustrated in FIG. 5(c), the central parts 42a of the electret films 42 face the third electrodes 53. In this case, the electrostatic motor drive circuit 13 makes the third electrodes 53 negative electrodes and makes the first electrodes 51 and the second electrodes 52 positive electrodes. Through electrostatic attractive forces acting from the first electrodes 51 and the second electrodes 52 on the electret films 42 and electrostatic repulsive forces acting from the third electrodes 53 on the electret films 42, rotational force toward the rotational direction CW are imparted to the electret films 42. The electrostatic motor drive circuit 13 successively switches the polarities of the first electrodes 51, the second electrodes 52, and the third electrodes 53 in accordance with the rotational positions of the electret films 42 to rotate the rotor 40.

As illustrated in FIG. 6, the booster circuit 15 has a first capacitor 21, a second capacitor 22, a third capacitor 23, a fourth capacitor 24, a first switch 25, and a second switch 26. As described below, the booster circuit 15 alternately switches the connection of the first capacitor 21, the second capacitor 22, and the third capacitor 23 to the constant voltage source 14 between parallel and serial and thereby boosts the output voltage of the constant voltage source 14 and stores electricity in the fourth capacitor 24.

The first switch 25 and the second switch 26 are switching elements such as a metal-oxide semiconductor field-effect transistor (MOSFET). The booster circuit 15 has six switches 25a, 25b, 25c, 25d, 25e, and 25f as the first switch 25. The switch 25a connects and disconnects the constant voltage source 14 and a first electrode 21a of the first capacitor 21. The switch 25b connects and disconnects the constant voltage source 14 and a first electrode 22a of the second capacitor 22. The switch 25c connects and disconnects the constant voltage source 14 and a first electrode 23a of the third capacitor 23. The switch 25d connects and disconnects a second electrode 21b of the first capacitor 21 and a second electrode 24b of the fourth capacitor 24. The switch 25e connects and disconnects a second electrode 22b of the second capacitor 22 and the second electrode 24b of the fourth capacitor 24. The switch 25f connects and disconnects a second electrode 23b of the third capacitor 23 and the second electrode 24b of the fourth capacitor 24.

The booster circuit 15 has four switches 26a, 26b, 26c, and 26d as the second switch 26. The switch 26a connects and disconnects the constant voltage source 14 and the second electrode 21b of the first capacitor 21 and the second electrode 24b of the fourth capacitor 24. The switch 26b connects and disconnects the first electrode 21a of the first capacitor 21 and the second electrode 22b of the second capacitor 22. The switch 26c connects and disconnects the first electrode 22a of the second capacitor 22 and the second electrode 23b of the third capacitor 23. The switch 26d connects and disconnects the first electrode 23a of the third capacitor 23 and a first electrode 24a of the fourth capacitor 24. The first electrode 24a of the fourth capacitor 24 is connected to the input of the electrostatic motor drive circuit 13.

The first switch 25 is turned on, and the second switch 26 is turned off, thereby making the booster circuit 15 a circuit equivalent to the circuit illustrated in FIG. 7. As illustrated in FIG. 7, the first capacitor 21, the second capacitor 22, and the third capacitor 23 are connected in parallel to the constant voltage source 14. Consequently, the three capacitors 21, 22, and 23 store electricity by the output voltage of the constant voltage source 14.

On the other hand, the first switch 25 is turned off, and the second switch 26 is turned on, thereby making the booster circuit 15 a circuit equivalent to the circuit illustrated in FIG. 8. As illustrated in FIG. 8, the first capacitor 21, the second capacitor 22, and the third capacitor 23 are connected in series to the constant voltage source 14. The fourth capacitor 24 is connected in parallel to the constant voltage source 14 and the three capacitors 21, 22, and 23 and stores electricity by the constant voltage source 14 and the three capacitors 21, 22, and 23. That is to say, the voltage of the constant voltage source 14 is boosted four times, which is stored in the fourth capacitor 24. The voltage boosted by the booster circuit 15 is supplied to the electrostatic motor drive circuit 13.

The control circuit 20 separately outputs a signal controlling the first switch 25 and a signal controlling the second switch 26. The control circuit 20 generates and outputs various kinds of clock signals about control of the electronic watch 1. The control circuit 20 alternately outputs a first control signal making the booster circuit the state illustrated in FIG. 7 and a second control signal making the booster circuit 15 the state illustrated in FIG. 8. The booster circuit 15 supplies boosted voltage to the electrostatic motor drive circuit 13 while alternately repeating the state illustrated in FIG. 7 and the state illustrated in FIG. 8 in accordance with the control signal from the control circuit 20.

The control circuit 20 of the present embodiment selectively executes a hand movement mode and a stop mode. The hand movement mode is a control mode for rotating the second hand 2. The hand movement mode is a normal mode, which moves all the second hand 2, the minute hand 3, and the hour hand 4. The control circuit 20, in the hand movement mode, moves the minute hand 3 and the hour hand 4 by the electromagnetic motor 12 and moves the second hand 2 by the electrostatic motor 11. That is to say, in the hand movement mode, the second hand 2, the minute hand 3, and the hour hand 4 all indicate respective positions corresponding to the current time. In the hand movement mode, the control circuit 20 rotatingly drives the electrostatic motor 11 as described with reference to FIG. 5 to continuously rotate the second hand 2.

The stop mode is a control mode for keeping the second hand 2 stationary. The stop mode is a power-saving mode, which keeps the second hand 2 stationary while moving the minute hand 3 and the hour hand 4. The control circuit 20, in the stop mode, moves the minute hand 3 and the hour hand 4 by the electromagnetic motor 12 and stops the second hand 2 by the electrostatic motor 11. As described below, the control circuit 20 of the present embodiment, in the stop mode, keeps the rotor 40 of the electrostatic motor 11 stationary while maintaining the polarities of the fixed electrodes 51, 52, and 53. The electronic watch 1 of the present embodiment does not switch the polarities of the fixed electrodes 51, 52, and 53 in the stop mode and can thereby reduce power consumption while holding the hand position of the second hand 2.

The following describes operation of the electrostatic motor 11 in the stop mode with reference to FIG. 9. The control circuit 20, in the stop mode, exerts electrostatic attractive forces F1 on the electret films 42 by counter electrodes. The counter electrodes are electrodes facing the central parts 42a of the electret films 42 among the fixed electrodes 51, 52, and 53. In FIG. 9, the third electrodes 53 face the central parts 42a of the electret films 42. In this case, the third electrodes 53 are the counter electrodes.

In the stop mode, the control circuit 20 makes the counter electrodes positive electrodes. That is to say, the control circuit 20 makes the polarity of the counter electrodes a polarity opposite to the polarity of the electret films 42. In FIG. 9, the third electrodes 53 as the counter electrodes are plus positive electrodes. The third electrodes 53 exert the electrostatic attractive forces F1 on the electret films 42. The electrostatic attractive forces F1 act so as to maintain the rotational positions of the electret films 42 at positions facing the third electrodes 53. That is to say, if the rotor 40 is about to rotate such that the electret films 42 depart from the third electrodes 53, the electrostatic attractive forces F1 prohibit the motion.

In the stop mode, the control circuit 20 exerts electrostatic repulsive forces on the electret films 42 by adjacent electrodes. The adjacent electrodes are electrodes adjacent to the counter electrodes among the fixed electrodes 51, 52, and 53. In FIG. 9, the first electrodes 51 and the second electrodes 52 are the adjacent electrodes.

In the stop mode, the control circuit 20 makes the adjacent electrodes negative electrodes. In FIG. 9, the first electrodes 51 and the second electrodes 52, which are the adjacent electrodes, are negatively charged. The first electrodes 51 and the second electrodes 52 each exert electrostatic repulsive forces F2 on the electret films 42. The electrostatic repulsive forces F2 exerted by the second electrodes 52 are repulsive forces toward the rotational direction CW. In contrast, the electrostatic repulsive forces F2 exerted by the first electrodes 51 are repulsive forces toward a direction opposite to the rotational direction CW. Consequently, the electrostatic repulsive forces F2 act so as to maintain the rotational positions of the electret films 42 at positions facing the third electrodes 53. That is to say, if the rotor 40 is about to rotate such that the electret films 42 departs from the third electrodes 53, the electrostatic repulsive forces F2 prohibit the motion. Consequently, the rotor 40, in which the electrostatic attractive forces F1 and the electrostatic repulsive forces F2 act on the electret films 42, generates a holding force and can prevent positional deviation of the hand caused by an impact acting on the electronic watch 1 or the like in the stop mode.

The control circuit 20, in the stop mode, maintains the polarity of the counter electrodes (the third electrodes 53 in this example) plus and maintains the polarity of the adjacent electrodes (the first electrodes 51 and the second electrodes 52 in this example) minus. The polarities of the respective fixed electrodes 51, 52, and 53 are not switched, whereby power consumption in the electrostatic motor 11 is reduced.

FIG. 10 is a diagram illustrating power consumption in the booster circuit when the electrostatic motor is operated. The following describes power consumption by switching of the polarities of the fixed electrodes 51, 52, and 53 with reference to FIG. 10. FIG. 10 illustrates a boosting clock signal SW, a boosted voltage VW, and a current waveform IW. The boosting clock signal SW is a switching signal for a boosting operation in the booster circuit 15. In accordance with on/off of the boosting clock signal SW, the first control signal and the second control signal are switched therebetween.

The boosted voltage VW is a voltage to be supplied to the electrostatic motor drive circuit 13. The current waveform IW is a current value passing through the booster circuit 15. Each time the boosting clock signal SW switches between on and off, a large current momentarily passes, and the current waveform IW rises in a spike shape. In FIG. 10, at a time t0, the polarities of the fixed electrodes 51, 52, and 53 are switched. Along with switching of the polarities, the boosted voltage VW temporarily reduces by parasitic capacitance or the like. Consequently, a current is required to be passed in order to restore the reduced boosted voltage VW, and power consumption in the booster circuit 15 increases.

By switching of a clock operation corresponding to the boosting clock signal SW, electric power is consumed by a through current of a level shifter and charging/discharging currents of gates of drivers of the switches 25 and 26. That is to say, the clock operation increases the power consumption in the booster circuit 15. The power consumption in the booster circuit 15 depends on the boosting clock signal SW and the boosted voltage VW. A higher frequency of the boosting clock signal SW gives higher power consumption, and a higher boosted voltage VW gives higher power consumption, for example.

In the electronic watch 1 of the present embodiment, switching of the polarities of the fixed electrodes 51, 52, and 53 is not performed in the stop mode. Consequently, the electronic watch 1 of the present embodiment can reduce power consumption in the stop mode. FIG. 11 illustrates a boosting clock signal SW2, a boosted voltage VW2, and a current waveform IW2 in the stop mode. Owing to the absence of switching of the polarities of the fixed electrodes 51, 52, and 53, no fluctuations occur in the boosted voltage VW2 as illustrated in FIG. 11.

Furthermore, the control circuit 20 of the present embodiment, in the stop mode, executes control to reduce the power consumption of the booster circuit 15 compared with the power consumption of the booster circuit 15 in the hand movement mode. As a specific example, the control circuit 20 of the present embodiment makes the number of clocks of the booster circuit 15 in the stop mode smaller than the number of clocks in the hand movement mode. The number N of clocks of the booster circuit 15 is the number of pulses of the boosting clock signal SW per unit time, for example. In FIG. 11, a boosting clock signal SW1 in the hand movement mode is indicated by the broken line for comparison.

In this example, the number N of clocks in the hand movement mode is referred to as a first number N1 of clocks, whereas the number N of clocks in the stop mode is referred to as a second number N2 of clocks. In the present embodiment, the number N of clocks is set as Formula (1) below. That is to say, the second number N2 of clocks is smaller than the first number N1 of clocks. The second number N2 of clocks may be a value half the first number N1 of clocks, for example.

$$N1 > N2 \tag{1}$$

The second number N2 of clocks is smaller than the first number N1 of clocks, whereby the power consumption of the booster circuit 15 in the stop mode is reduced. The number of spikes in the current waveform IW occurring in unit time reduces, for example. Consequently, the electronic watch 1 of the present embodiment can achieve both reduction in power consumption and holding of the stopping position of the second hand 2.

The electronic watch 1 of the present embodiment switches the control mode as described with reference to FIG. 12, for example. The control flow illustrated in FIG. 12 is executed repeatedly at certain intervals, for example. At Step S10, the control circuit 20 sets the control mode of the electronic watch 1 at the hand movement mode. Upon execution of Step S10, the process advances to Step S20.

At Step S20, the control circuit 20 determines whether no-power generation has been continuing for 30 minutes or more. If a state in which power generation by the power generation mechanism 16 is not performed has been continuing for 30 minutes or more, affirmative determination is made at Step S20, and the process advances to Step S30. In contrast, if negative determination is made at Step S20, the process shifts to Step S10.

At Step S30, the control circuit 20 sets the control mode of the electronic watch 1 at the stop mode. The control circuit 20 stops the second hand 2 by the electrostatic motor 11. The control circuit 20 of the present embodiment stops the second hand 2 at a stopping position set in advance. The stopping position of the second hand 2 is a position indicating the power-saving display 35. Consequently, upon setting the stop mode, the control circuit 20 moves the second hand 2 to the position indicating the power-saving display 35 and stops the second hand 2 at the position indicating the power-saving display 35.

A condition for returning to the hand movement mode from the stop mode is that power generation by the power generation mechanism 16 is detected. When power generation by the power generation mechanism 16 is detected, and when the accumulation of a power generation time by the power generation mechanism 16 reaches a certain determination value, for example, the control circuit 20 drives the electrostatic motor 11 to rotate the second hand 2 to a position corresponding to an internal time and switches the control mode of the electronic watch 1 to the hand movement mode. The internal time is a time acquired from a current time holding unit holding the current time within the control circuit 20.

As described above, the electronic watch 1 of the present embodiment has the power source 17, the electrostatic motor 11, the second hand 2, and the control circuit 20. The electrostatic motor 11 has the rotor 40 and the fixed electrodes 51, 52, and 53. In the rotor 40, the electret films 42 are arranged in the rotational direction. The fixed electrodes 51, 52, and 53 are arranged in the rotational direction of the rotor 40 at positions facing the rotor 40. The control circuit 20 functions as the motor control circuit controlling the electrostatic motor 11.

The control circuit 20 selectively executes the hand movement mode, which rotates the second hand 2, and the stop mode, which keeps the second hand 2 stationary. In the stop mode, the control circuit 20 keeps the rotor 40 stationary through the electrostatic forces exerted on the electret films 42 from the fixed electrodes 51, 52, and 53 while maintaining the polarities of the fixed electrodes 51, 52, and 53. The electronic watch 1 of the present embodiment maintains the polarities of the fixed electrodes 51, 52, and 53 in the stop mode and can thereby keep the second hand 2 stationary while reducing power consumption.

The control circuit 20 of the present embodiment, in the stop mode, exerts the electrostatic forces on the electret films 42 by the counter electrodes. The counter electrodes are the fixed electrodes 51, 52, and 53 facing the central parts 42a of the electret films 42. The central parts 42a are the central pasts of the electret films 42 in the rotational direction CW, for example. The electrostatic forces are exerted on the electret films 42 by the counter electrodes, whereby an appropriate holding force keeping the second hand 2 stationary can be generated.

The control circuit 20 of the present embodiment, in the stop mode, exerts the electrostatic repulsive forces on the electret films 42 by the adjacent electrodes. The adjacent electrodes are the fixed electrodes 51, 52, and 53 adjacent to the counter electrodes. The electrostatic repulsive forces exerted by the adjacent electrodes can prohibit the rotation of the second hand 2.

The electronic watch 1 of the present embodiment further has the booster circuit 15 and a voltage control circuit. The booster circuit 15 is a circuit boosting the voltage of the power source 17 and supplying the voltage to the electrostatic motor 11. The control circuit 20 has a function as the voltage control circuit. The control circuit 20, in the stop mode, reduces the power consumption of the booster circuit 15 compared with the power consumption thereof in the hand movement mode. The power consumption in the booster circuit 15 is reduced, whereby the second hand 2 can be kept stationary while reducing power consumption.

The control circuit 20 of the present embodiment makes the number of clocks of the booster circuit 15 in the stop mode (the second number N2 of clocks) smaller than the number of clocks of the booster circuit 15 in the hand movement mode (the first number N1 of clocks). With this setting, the power consumption in the stop mode can be reduced.

The electrostatic motor 11 of the present embodiment may have fixed electrodes on both sides in an axial direction for the rotor 40. In this case, a second stator is placed on a side opposite to the stator 50 for the rotor 40. In the second stator, U phase, V phase, and W phase fixed electrodes are arranged. In the stop mode, among the fixed electrodes arranged in the second stator, the counter electrodes are positive electrodes, whereas the adjacent electrodes are negative electrodes.

Second Embodiment

Figure 13:
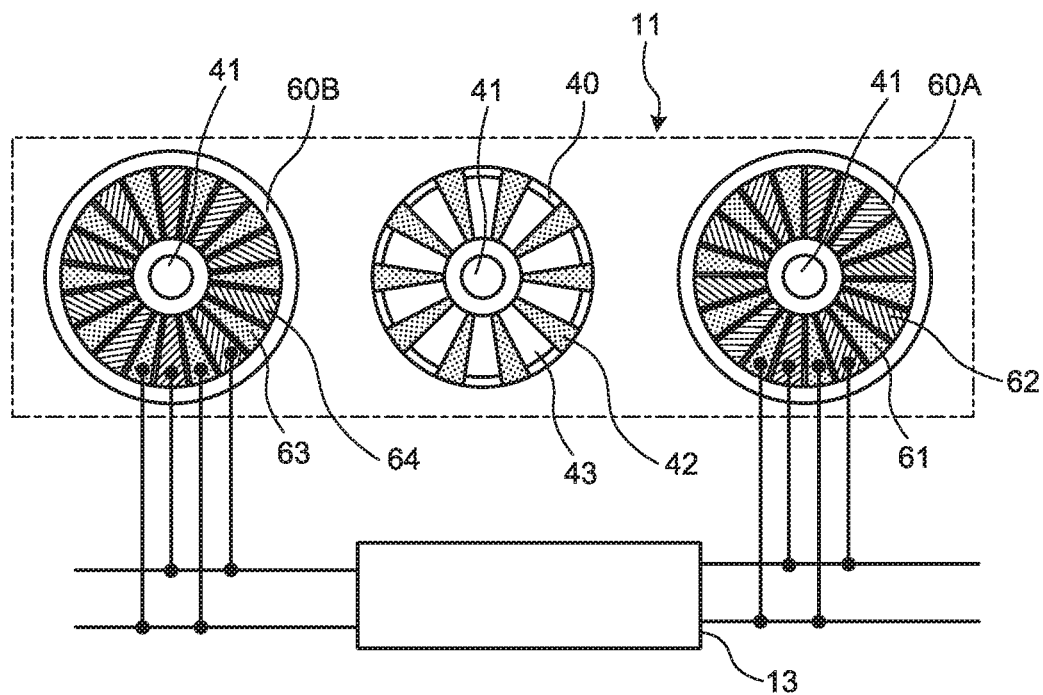
FIG. 13 is a schematic configuration diagram of the electrostatic motor according to a second embodiment.
Figure 14:
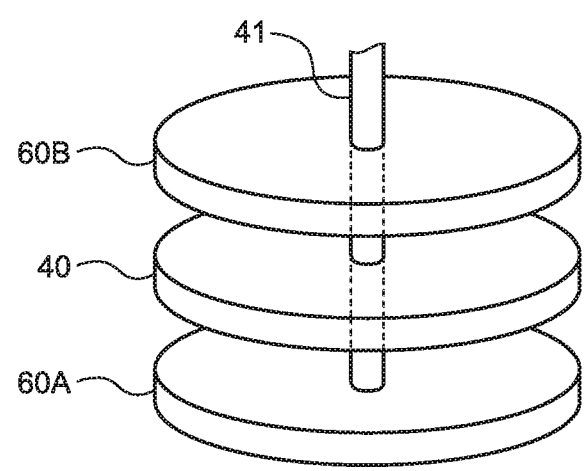
FIG. 14 is a schematic perspective view of the electrostatic motor according to the second embodiment.
Figure 15:
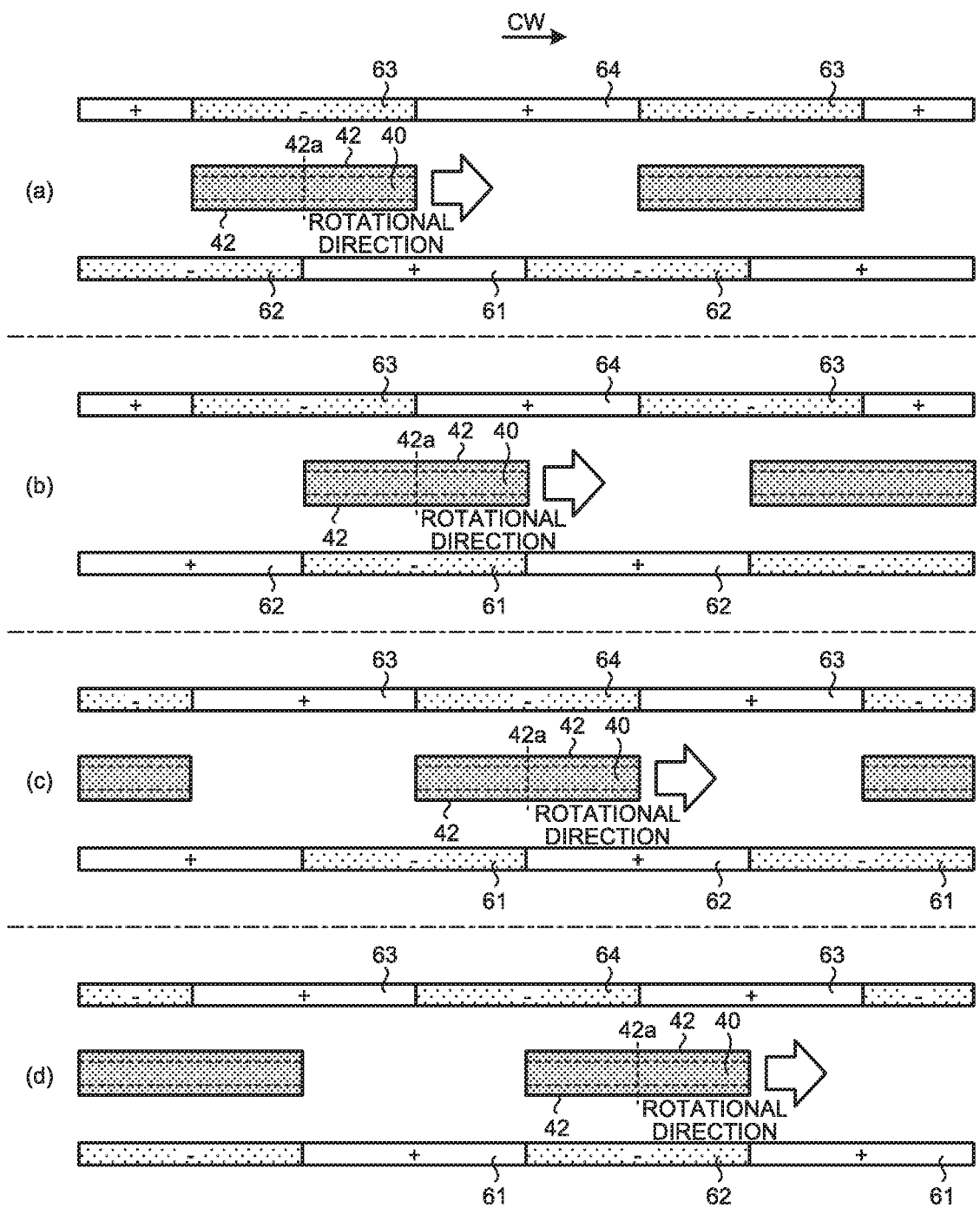
FIG. 15 is a diagram of an example of hand movement control of the second embodiment.
Figure 16:
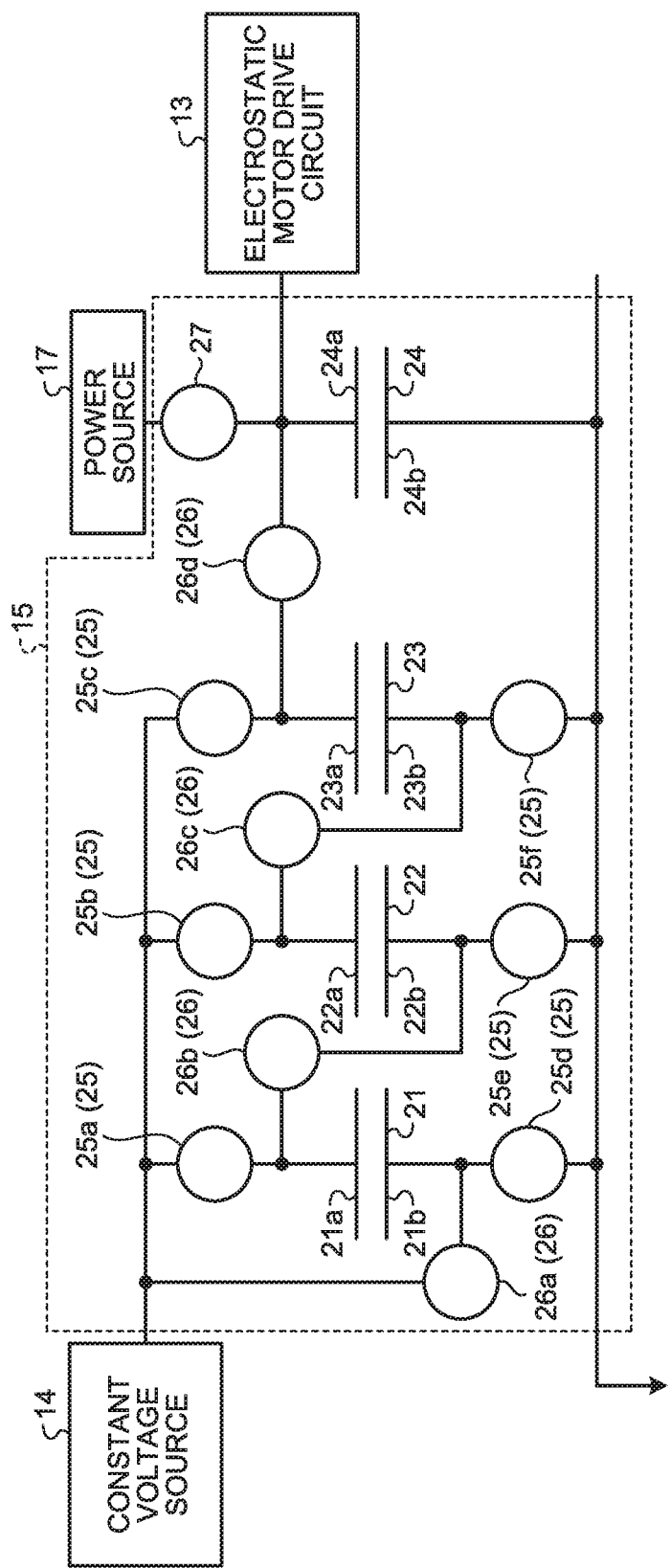
FIG. 16 is a diagram of a booster circuit of the second embodiment.
Figure 17:
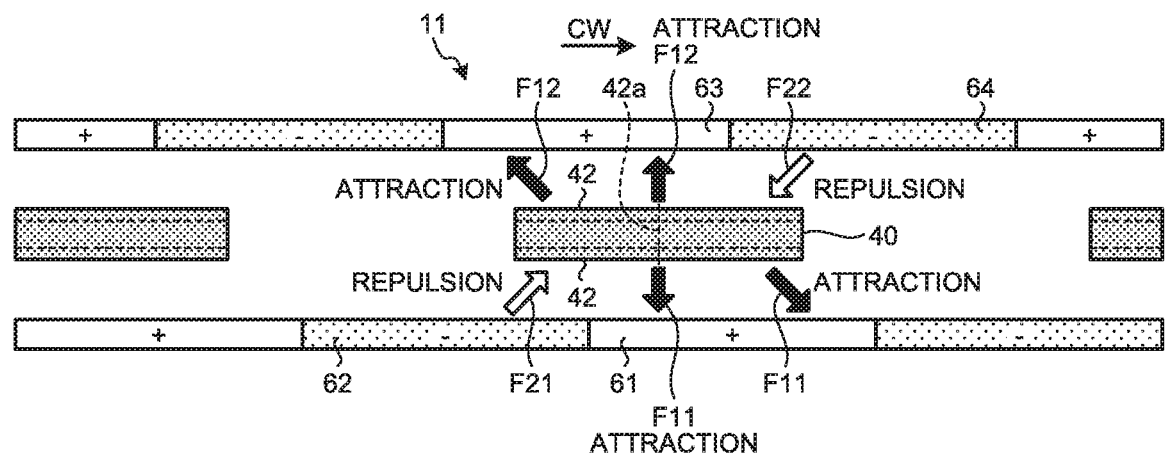
FIG. 17 is a diagram illustrating a stop mode according to the second embodiment.
Figure 18:
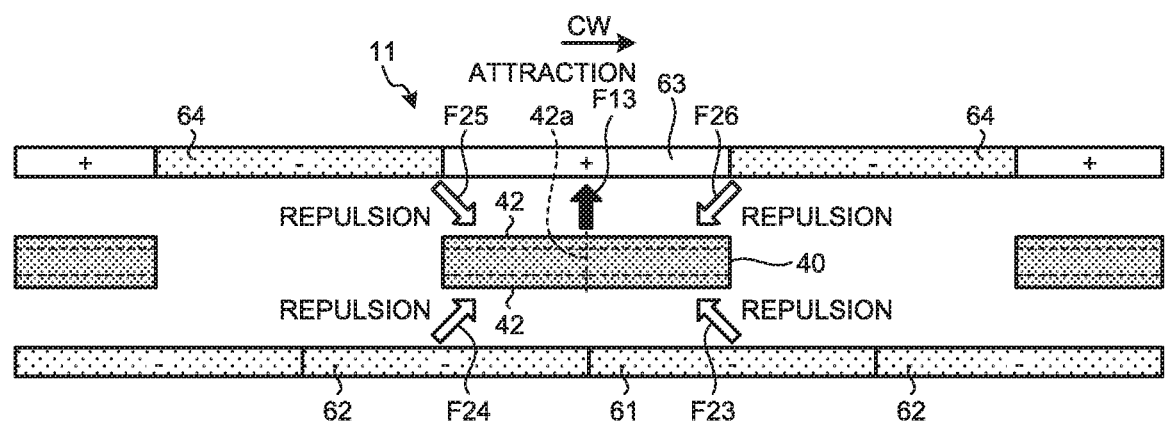
FIG. 18 is a diagram of another example of the stop mode according to the second embodiment.

The following describes a second embodiment with reference to FIG. 13 to FIG. 18. For the second embodiment, components having functions similar to those described in the first embodiment are denoted by the same symbols, and a duplicate description is omitted. FIG. 13 is a schematic configuration diagram of the electrostatic motor according to the second embodiment, FIG. 14 is a schematic perspective view of the electrostatic motor according to the second embodiment, FIG. 15 is a diagram of an example of hand movement control of the second embodiment, FIG. 16 is a diagram of the booster circuit of the second embodiment, FIG. 17 is a diagram illustrating the stop mode according to the second embodiment, and FIG. 18 is a diagram of another example of the stop mode according to the second embodiment.

As illustrated in FIG. 13 and FIG. 14, the electrostatic motor 11 according to the second embodiment has the rotor 40, the rotational shaft 41, a first stator 60A, and a second stator 60B. The shape of the first stator 60A and the second stator 60B is a disc shape; the stators 60A and 60B are not limited to be of a disc shape and may be of a rectangular shape or the like. The first stator 60A and the second stator 60B of the present embodiment face each other with the rotor 40 interposed therebetween. That is to say, the first stator 60A faces one face of the rotor 40, whereas the second stator 60B faces the other face of the rotor 40. The rotor 40 is placed concentrically with the first stator 60A and the second stator 60B and spaced apart from the first stator 60A and the second stator 60B.

The electrostatic motor 11 of the present embodiment is a two-phase motor. In the first stator 60A, on a face facing the rotor 40, first electrodes 61 and second electrodes 62 as fixed electrodes are arranged. The first electrodes 61 and the second electrodes 62 are alternately arranged in the rotational direction of the rotor 40. In the second stator 60B, on a face facing the rotor 40, third electrodes 63 and fourth electrodes 64 as fixed electrodes are arranged. The third electrodes 63 and the fourth electrodes 64 are alternately arranged in the rotational direction of the rotor 40. The third electrodes 63 and the fourth electrodes 64 are out of rotational phase with both the first electrodes 61 and the second electrodes 62. Specifically, an electrode pair consisting of a third electrode 63 and a fourth electrode 64 that are adjacent to each other is arranged displaced with an electrode pair consisting of a first electrode 61 and a second electrode 62 that are adjacent to each other by ¼ of a cycle.

The first electrodes 61 are electrically connected to the electrostatic motor drive circuit 13 via common first wiring. The second electrodes 62 are electrically connected to the electrostatic motor drive circuit 13 via common second wiring. The third electrodes 63 are electrically connected to the electrostatic motor drive circuit 13 via common third wiring. The fourth electrodes 64 are electrically connected to the electrostatic motor drive circuit 13 via common fourth wiring.

FIG. 15 illustrates an example of control to rotatingly drive the rotor 40. In a state illustrated in FIG. 15(a), the third electrodes 63 face the central parts 42a of the electret films 42. The first electrodes 61 and the fourth electrodes 64 are positioned forward in the rotational direction CW relative to the electret films 42, whereas the second electrodes 62 are positioned rearward in the rotational direction CW relative thereto. In this case, the control circuit 20 makes the second electrodes 62 and the third electrodes 63 negative electrodes and makes the first electrodes 61 and the fourth electrodes 64 positive electrodes. The second electrodes 62 exert electrostatic repulsive forces toward the rotational direction CW on the electret films 42. The first electrodes 61 and the fourth electrodes 64 exert electrostatic attractive forces toward the rotational direction CW on the electret films 42.

In a state illustrated in FIG. 15(*b*), the first electrodes 61 face the central parts 42*a* of the electret films 42. The second electrodes 62 and the fourth electrodes 64 are positioned forward in the rotational direction CW relative to the electret films 42, whereas the third electrodes 63 are positioned rearward in the rotational direction CW relative thereto. In this case, the control circuit 20 makes the first electrodes 61 and the third electrodes 63 negative electrodes and makes the second electrodes 62 and the fourth electrodes 64 positive electrodes. Consequently, electrostatic forces toward the rotational direction CW act on the electret films 42.

In a state illustrated in FIG. 15(*c*), the fourth electrodes 64 face the central parts 42*a* of the electret films 42. The second electrodes 62 and the third electrodes 63 are positioned forward in the rotational direction CW relative to the electret films 42, whereas the first electrodes 61 are positioned rearward in the rotational direction CW relative thereto. In this case, the control circuit 20 makes the first electrodes 61 and the fourth electrodes 64 negative electrodes and makes the second electrodes 62 and the third electrodes 63 positive electrodes. Consequently, electrostatic forces toward the rotational direction CW act on the electret films 42.

In a state illustrated in FIG. 15(*d*), the second electrodes 62 face the central parts 42*a* of the electret films 42. The first electrodes 61 and the third electrodes 63 are positioned forward in the rotational direction CW relative to the electret films 42, whereas the fourth electrodes 64 are positioned rearward in the rotational direction CW relative thereto. In this case, the control circuit 20 makes the second electrodes 62 and the fourth electrodes 64 negative electrodes and makes the first electrodes 61 and the third electrodes 63 positive electrodes. Consequently, electrostatic forces toward the rotational direction CW act on the electret films 42.

As described above, the control circuit 20 successively switches the polarities of the first electrodes 61, the second electrodes 62, the third electrodes 63, and the fourth electrodes 64 to impart a rotational force to the rotor 40. In the electrostatic motor 11 of the present embodiment, the first stator 60A and the second stator 60B each have two-phase electrodes and is substantially controlled as a four-phase motor.

FIG. 16 is a diagram of the booster circuit of the second embodiment. A different point in the booster circuit 15 of the second embodiment from the booster circuit 15 of the first embodiment (FIG. 6) is that a third switch 27 is provided between the power source 17 and the electrostatic motor drive circuit 13. When the third switch 27 is turned on, the power source 17 is connected to an input part of the electrostatic motor drive circuit 13 without involving the constant voltage source 14 and the booster circuit 15. In this case, the output voltage of the power source 17 is input voltage to the electrostatic motor drive circuit 13.

The following describes operation of the electrostatic motor 11 in the stop mode of the second embodiment with reference to FIG. 17. The control circuit 20, in the stop mode, exerts electrostatic attractive forces on the electret films 42 by the counter electrodes. In a state illustrated in FIG. 17, the first electrodes 61 and the third electrodes 63 face the central parts 42*a* of the electret films 42. The fourth electrodes 64 are positioned forward in the rotational direction CW relative to the central parts 42*a* of the electret films 42. The second electrodes 62 are positioned rearward in the rotational direction CW relative to the central parts 42*a* of the electret films 42. That is to say, the first electrodes 61 and the third electrodes 63 are the counter electrodes, whereas the second electrodes 62 and the fourth electrodes 64 are the adjacent electrodes.

In this state, the control circuit 20 makes the first electrodes 61 and the third electrodes 63 positive electrodes and makes the second electrodes 62 and the fourth electrodes 64 negative electrodes. The first electrodes 61 and the third electrodes 63 exert electrostatic attractive forces on the electret films 42. There is a phase difference between the phase of the first electrodes 61 and the phase of the third electrodes 63. Consequently, the first electrodes 61 exert electrostatic attractive forces F11 toward the rotational direction CW on the electret films 42. On the other hand, the third electrodes 63 exert electrostatic attractive forces F12 in a direction opposite to the rotational direction CW on the electret films 42. These electrostatic attractive forces F11 and F12 are cancelled out each other in the rotational direction CW. That is to say, the rotor 40 stops at a position in which the electrostatic attractive forces F11 and F12 are balanced.

The second electrodes 62 exert electrostatic repulsive forces F21 toward the rotational direction CW on the electret films 42. On the other hand, the fourth electrodes 64 exert electrostatic repulsive forces F22 in a direction opposite to the rotational direction CW on the electret films 42. These electrostatic repulsive forces F21 and F22 are cancelled out each other. That is to say, the rotor 40 stops at a position in which the electrostatic repulsive forces F21 and F22 are balanced.

The control circuit 20 of the present embodiment, in the stop mode, stops boosting by the booster circuit 15 and supplies the voltage of the power source 17 to the electrostatic motor 11. The control circuit 20, in the stop mode, stops boosting by the booster circuit 15 and turns on the third switch 27. The power source 17 and the electrostatic motor drive circuit 13 are connected to each other via the third switch 27. With this operation, the voltage of the power source 17 is supplied to the electrostatic motor drive circuit 13. When stopping boosting by the booster circuit 15, the control circuit 20 may turn off the first switch 25 and the second switch 26.

Boosting by the booster circuit 15 is stopped, whereby the power consumption in the booster circuit 15 is reduced. Consequently, the electronic watch 1 of the present embodiment can reduce power consumption while holding the hand position of the second hand 2 in the stop mode.

The control circuit 20 may supply voltage lower than the voltage of the power source 17 to the electrostatic motor 11 in the stop mode. In the stop mode, the output voltage of the constant voltage source 14 may be supplied to the electrostatic motor drive circuit 13, for example. In this case, the first switch 25*c* and the second switch 26*d* are arranged so as to connect the constant voltage source 14 and the electrostatic motor drive circuit 13, for example.

In the stop mode illustrated in FIG. 17, the rotor 40 stops at the position in which the electrostatic attractive forces F11 and F12 are balanced; the rotor 40 may be stopped through electrostatic forces illustrated in FIG. 18. In the stop mode illustrated in FIG. 18, the third electrodes 63 exert electrostatic attractive forces F13 on the electret films 42, whereas the first electrodes 61, the second electrodes 62, and the fourth electrodes 64 exert electrostatic repulsive forces F23, F24, F25, and F26 on the electret films 42. More specifically, the first electrodes 61 exert the electrostatic repulsive forces F23 in a direction opposite to the rotational direction CW on the electret films 42. The second electrodes 62 exert the electrostatic repulsive forces F24 in the rotational direction CW on the electret films 42. The fourth electrodes 64 exert the electrostatic repulsive forces F25 in the rotational direction CW and the electrostatic repulsive forces F26 in a direction opposite to the rotational direction CW on the electret films 42. The rotor 40 stops at a position in which the two electrostatic repulsive forces F24 and F25 in the rotational direction CW and the two electrostatic repulsive forces F23 and F26 in the opposite direction are balanced.

As described above, the control circuit 20 according to the second embodiment, in the stop mode, stops boosting by the booster circuit 15 and supplies voltage that is equal to or lower than the voltage of the power source 17 to the electrostatic motor 11 to reduce the power consumption of the booster circuit 15 in the stop mode while applying the electrostatic attractive forces F11, F12, and F13 and the electrostatic repulsive forces F21, F22, F23, F24, F25, and F26 to the rotor 40.

Third Embodiment

Figure 19:
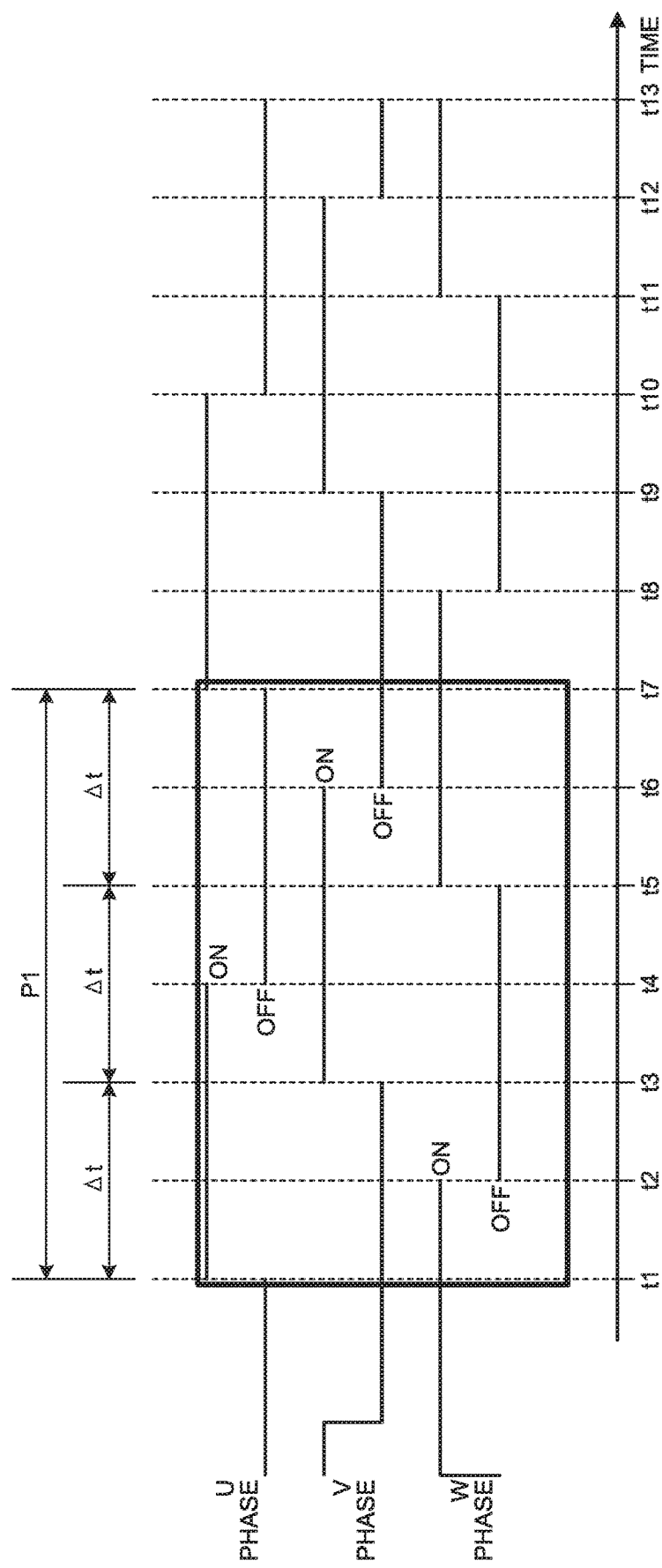
FIG. 19 is a diagram of an example of a drive signal according to a third embodiment.
Figure 20:
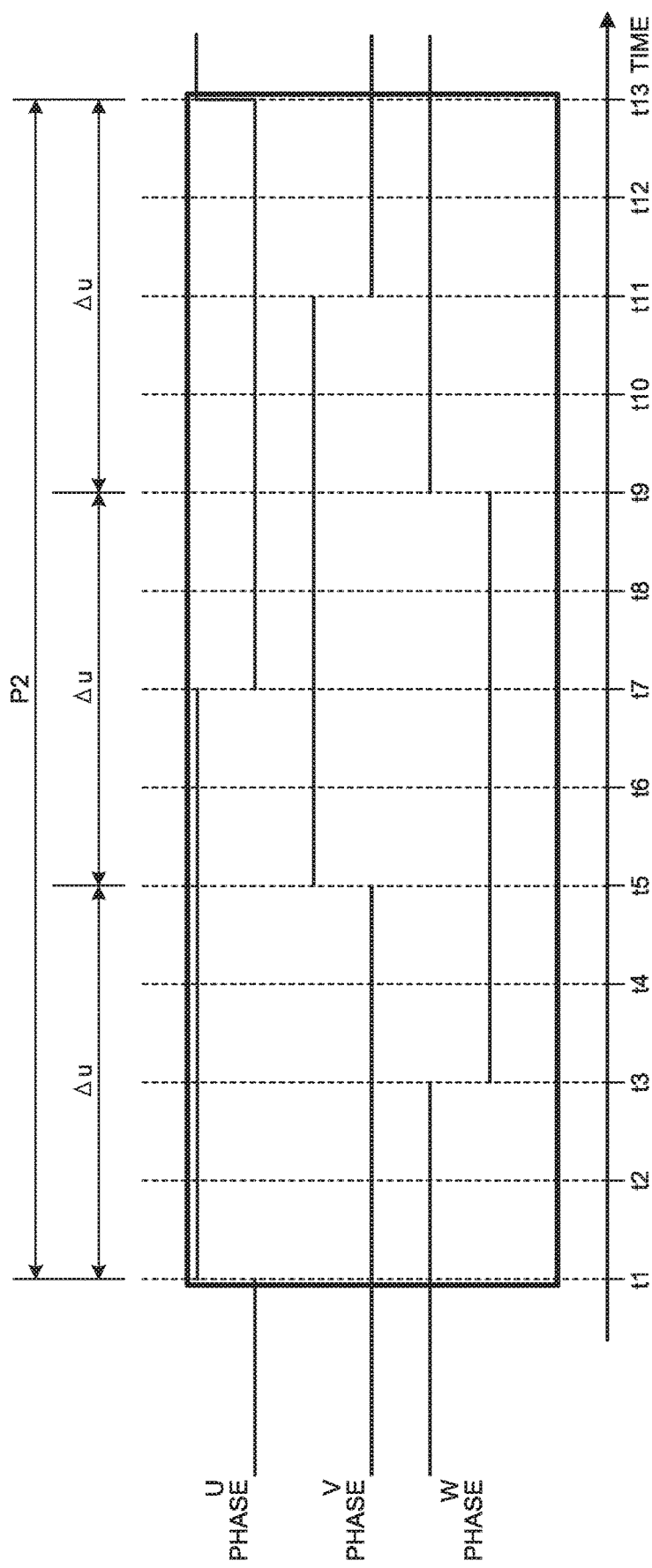
FIG. 20 is a diagram of an example of the drive signal in return control of the third embodiment.
Figure 21:
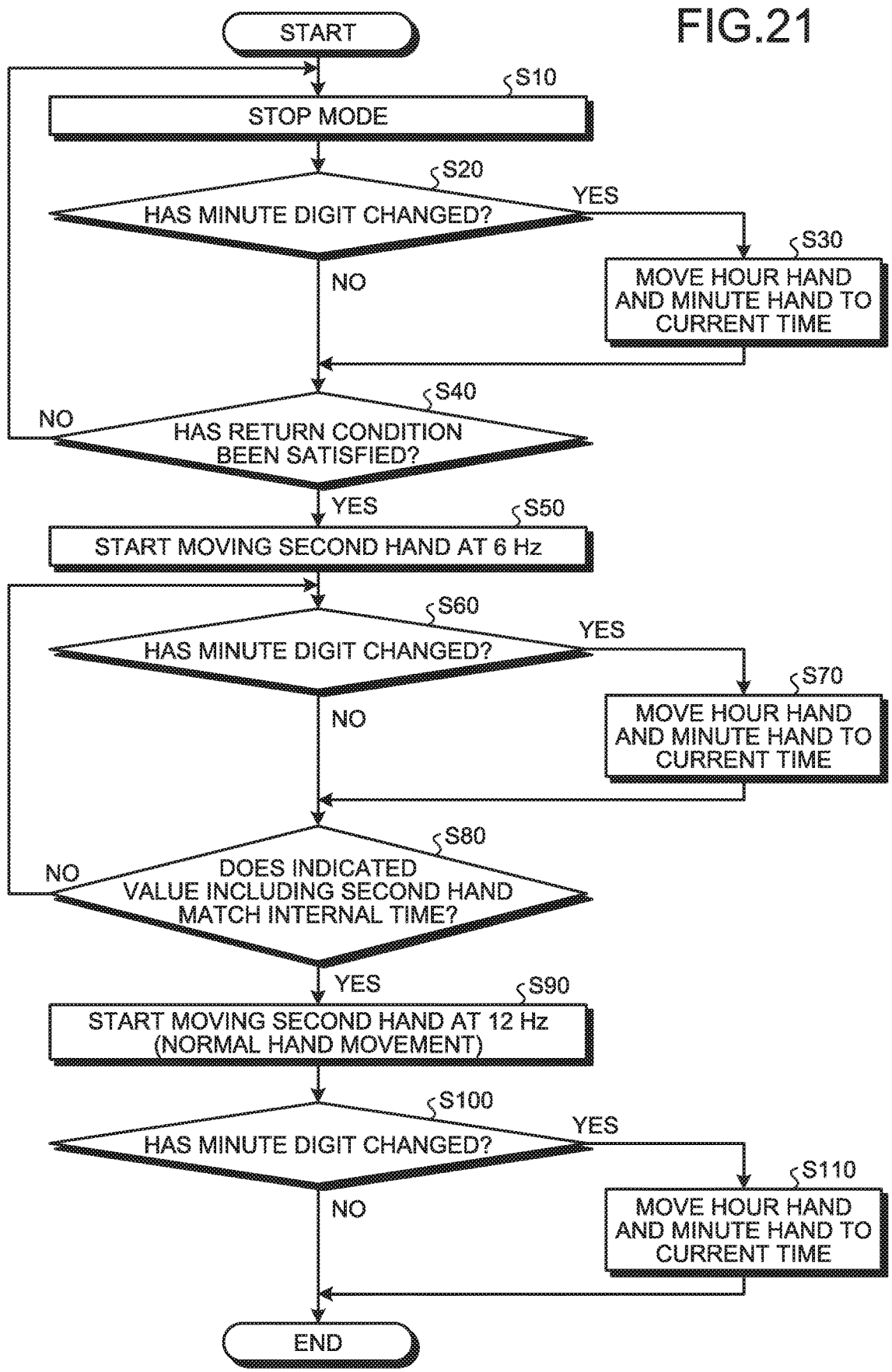
FIG. 21 is a flowchart of operation of the electronic watch according to the third embodiment.
Figure 22:
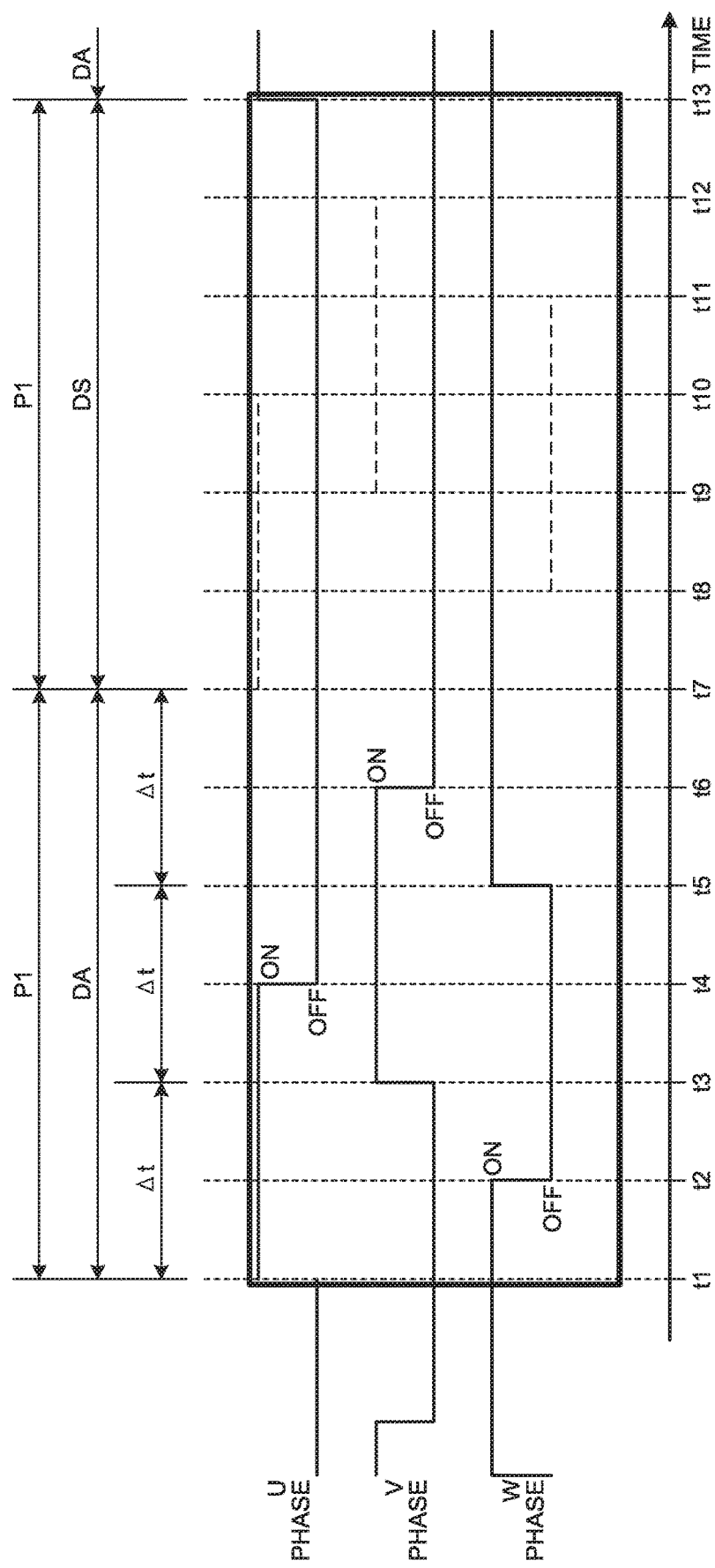
FIG. 22 is a diagram of another example of the drive signal in the return control of the third embodiment.
Figure 24:
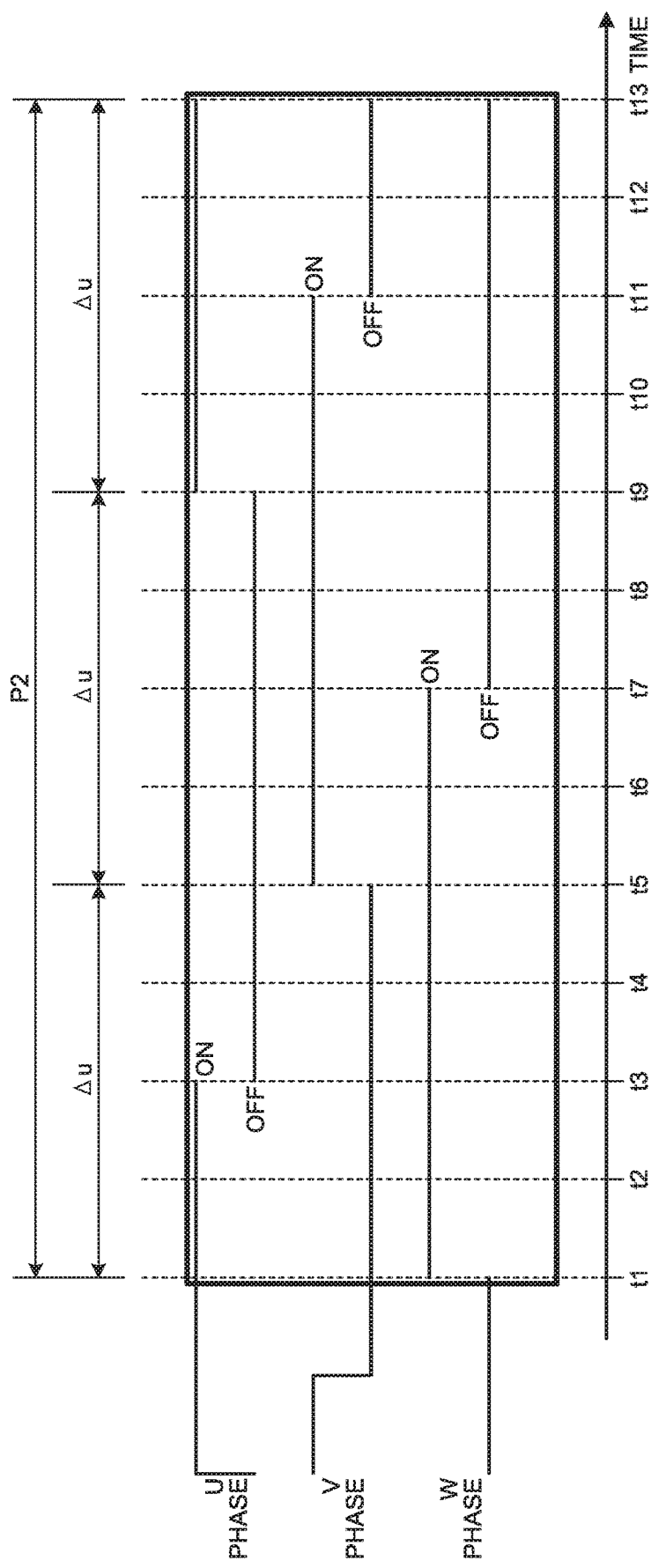
FIG. 24 is a diagram of an example of the drive signal according to the third embodiment.
Figure 25:
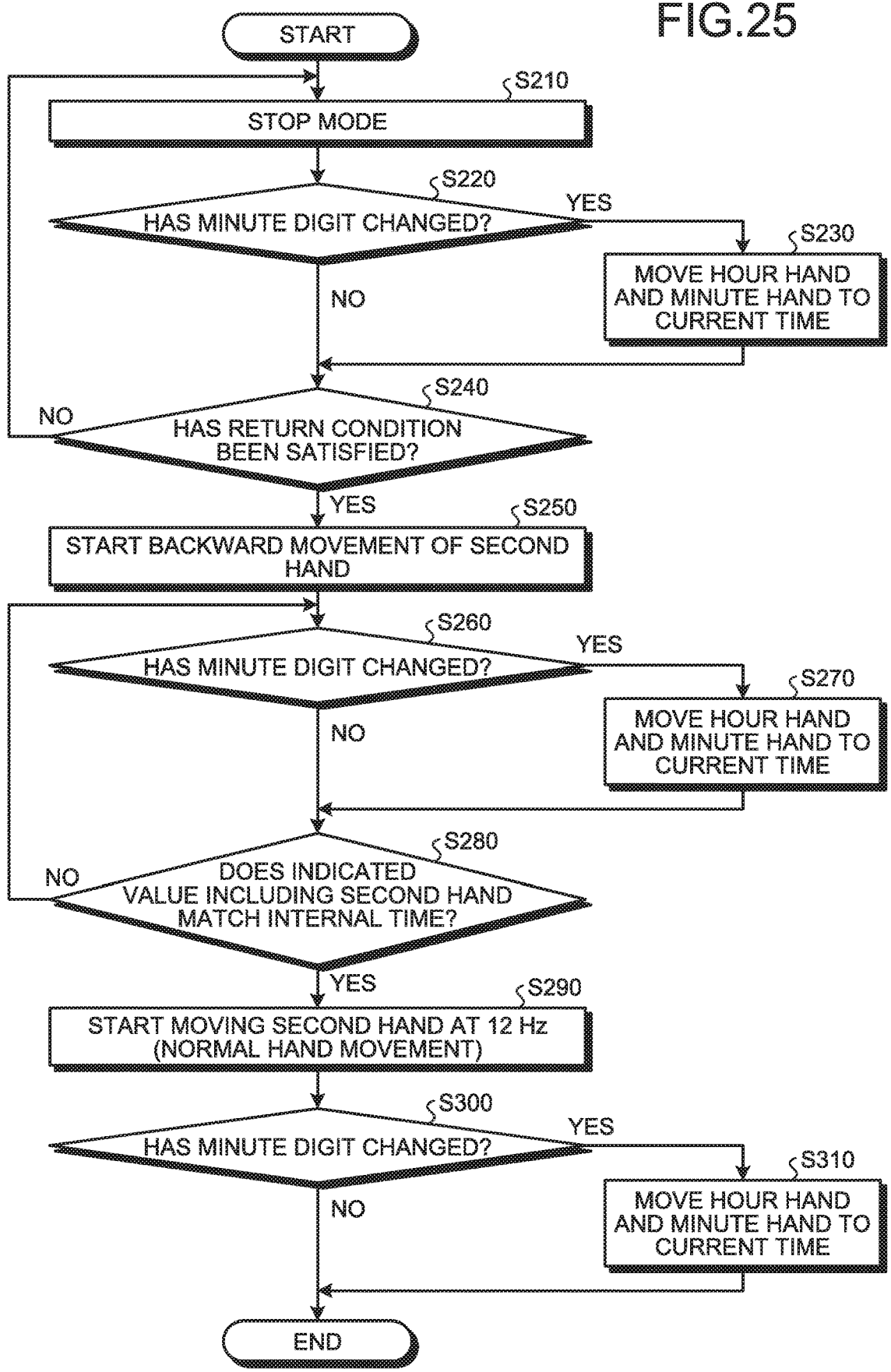
FIG. 25 is another flowchart according to the third embodiment.
Figure 27:
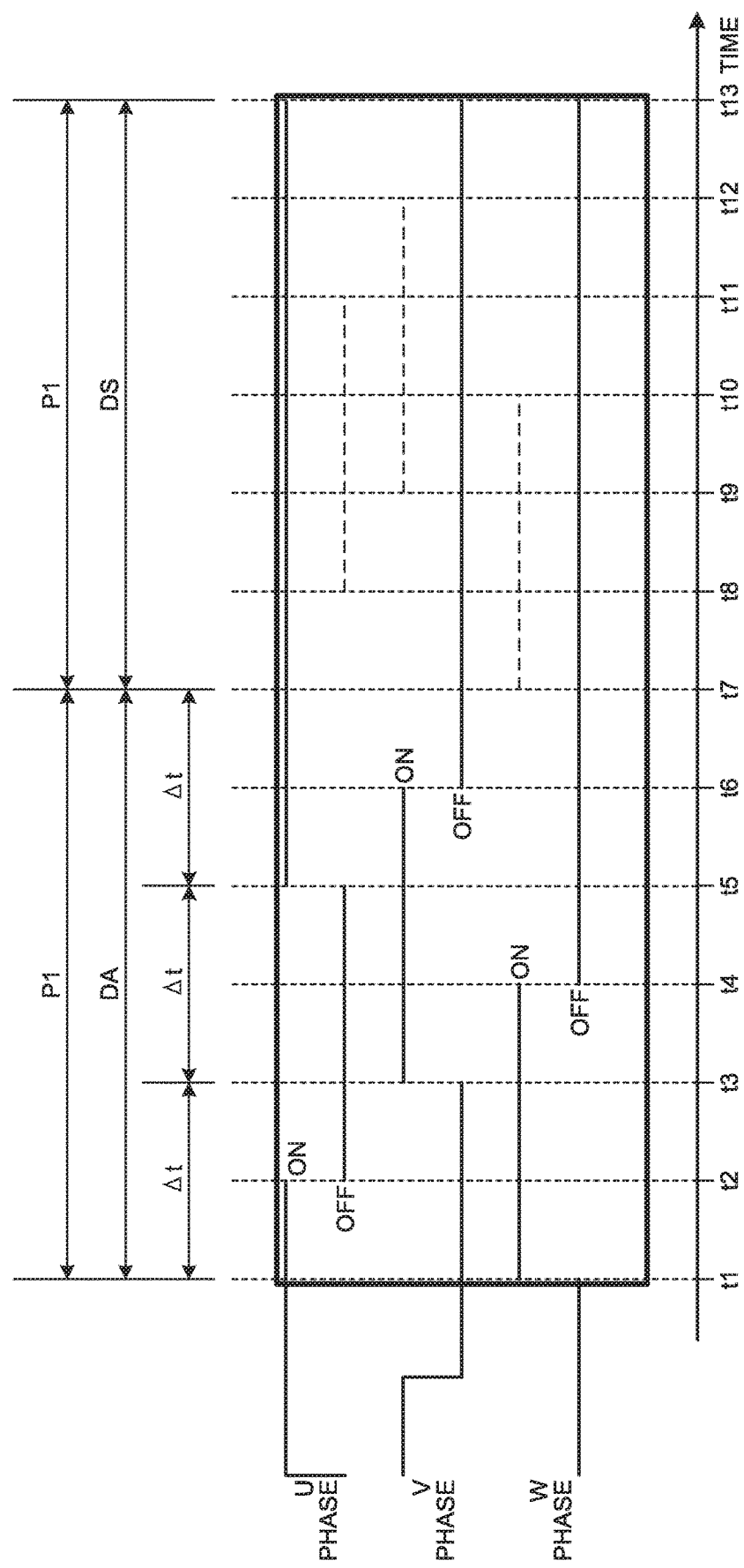
FIG. 27 is a diagram of another example of the drive signal according to the third embodiment.

The following describes a third embodiment with reference to FIG. 19 to FIG. 28. For the third embodiment, components having functions similar to those described in the first embodiment and the second embodiment are denoted by the same symbols, and a duplicate description is omitted. FIG. 19 is a diagram of an example of a drive signal according to the third embodiment, FIG. 20 is a diagram of an example of the drive signal in return control of the third embodiment, FIG. 21 is a flowchart of operation of the electronic watch according to the third embodiment, FIG. 22 is a diagram of another example of the drive signal in the return control of the third embodiment, FIG. 23 is a diagram of changes in an internal time and a display time in the return control of the third embodiment, FIG. 24 is a diagram of an example of the drive signal according to the third embodiment, FIG. 25 is another flowchart according to the third embodiment, FIG. 26 is a diagram of changes in the internal time and the display time in the return control of the third embodiment, and FIG. 27 is a diagram of another example of the drive signal according to the third embodiment.

The control circuit 20 of the third embodiment selectively executes the hand movement mode and the stop mode like the control circuit 20 of the first embodiment and the second embodiment. The control circuit 20 executes the return control when returning to the hand movement mode from the stop mode.

The control circuit 20, in the hand movement mode, rotates the second hand 2 by what is called sweep hand movement. The sweep hand movement is a hand movement mode for rotating the second hand 2 continuously without stopping it. In the hand movement mode, electrostatic forces in the rotational direction CW are continuously imparted to the rotor 40. The control circuit 20, in the hand movement mode, sets the frequency of a drive signal of the electrostatic motor 11 at a first frequency fr1 [Hz]. The first frequency fr1 is a frequency larger than 1 [Hz]. The value of the first frequency fr1 of the present embodiment is 12 [Hz]. FIG. 19 illustrates an example of the drive signal of the electrostatic motor 11 in the hand movement mode.

FIG. 19 illustrates an example of drive pulses for the U phase, the V phase, and the W phase. When the drive pulse is on, the potential of corresponding electrodes is plus, whereas when the drive pulse is off, the potential of the corresponding electrodes is minus. When the drive pulse of the U phase is on, the first electrodes 51 are positively charged, and the drive pulse of the U phase is off, the first electrodes 51 are negatively charged, for example. In FIG. 20, FIG. 22, FIG. 24, FIG. 27, and FIG. 28 similarly, when the drive pulse is on, the potential of the corresponding electrodes is plus, whereas when the drive pulse is off, the potential of the corresponding electrodes is minus.

In the drive signal illustrated in FIG. 19, the drive pulse for the U phase, that is, the drive pulse to be output to the first electrodes 51 is turned on at a time t1, is turned off at a time t4, and is turned on again at a time t7. The first electrodes 51 are positive electrodes when the drive pulse is on and function as negative electrodes when the drive pulse is off. A period P1 of the drive signal of the electrostatic motor 11 in the hand movement mode is a time from the time t1 to the time t7. A phase difference Δt of the drive pulse of the V phase relative to the drive pulse of the U phase is ⅓ of the period P1. Similarly, a phase difference Δt of the drive pulse of the W phase relative to the drive pulse of the V phase is ⅓ of the period P1. The control circuit 20 periodically changes the three-phase drive pulses by providing the phase difference Δt as illustrated in FIG. 19 to rotate the second hand 2 at a substantially constant speed.

When a shift condition set in advance is satisfied, the control circuit 20 shifts the electronic watch 1 from the hand movement mode to the stop mode. The shift condition is a determination condition for determining execution of the shift from the hand movement mode to the stop mode. The shift condition is that a state in which power generation is not performed in the power generation mechanism 16 continues for a certain time, for example. The certain time may be set at 30 minutes, for example.

Upon satisfaction of the shift condition, the control circuit 20 stops the second hand 2 by the electrostatic motor 11. As described above, the stopping position of the second hand 2 is the position on the hour. The electronic watch 1 of the present embodiment keeps the rotor 40 stationary through electrostatic forces exerted on the electret films 42 from the electrodes 51, 52, and 53 of the electrostatic motor 11.

When a return condition set in advance is satisfied, the control circuit 20 returns the electronic watch 1 to the hand movement mode from the stop mode. The return condition is that power generation in the power generation mechanism 16 is detected, for example. The return condition may be that power generation in the generation mechanism 16 is detected continuously for a certain time or may be that an accumulated power generation time in the generation mechanism 16 reaches a certain time.

Upon satisfaction of the return condition, the control circuit 20 executes the return control. The return control is control making the position of the second hand 2 match the position corresponding to the internal time. The return control is executed in a transition period returning to the hand movement mode from the stop mode.

The control circuit 20, in the return control, makes the rotational speed of the second hand 2 a speed lower than the speed in the hand movement mode to make the position of the second hand 2 and the position corresponding to the internal time match each other. In the following description, the rotational speed of the second hand 2 in the hand movement mode will be referred to as "a first rotational speed V1," whereas the rotational speed of the second hand 2 in the return control will be referred to as "a second rotational speed V2." The first rotational speed V1 is a speed at which the second hand 2 makes one rotation for 1 minute. The second rotational speed V2 is a rotational speed lower than the first rotational speed V1 and is a speed ½ of the first rotational speed V1, for example.

As described with reference to FIG. 20, for example, the control circuit 20 adjusts the frequency of the drive signal of the electrostatic motor 11 to make the rotational speed of the second hand 2 the second rotational speed V2. FIG. 20 illustrates an example of the drive signal of the electrostatic motor 11 in the return control.

In FIG. 20, the drive pulse of the U phase is turned on from a time t1 to a time t7 and is turned off from the time t7 to a time t13. The duration from the time t1 to the time t13 is a period P2 of the drive signal of the electrostatic motor 11. A phase difference Δu of the drive pulse of the V phase relative to the drive pulse of the U phase is ⅓ of the period P2. Similarly, a phase difference Δu of the drive pulse of the W phase relative to the drive pulse of V phase is ⅓ of the period P2. The period P2 of the return control is double the period P1 of the hand movement mode. In other words, the second frequency fr2 as the frequency of the drive signal of the electrostatic motor 11 in the return control is ½ of the first frequency fr1 in the hand movement mode. When the first frequency fr1 of the hand movement mode is 12 [Hz], the second frequency fr2 of the return control is 6 [Hz]. Consequently, the second rotational speed V2 for the return control is ½ of the first rotational speed V1.

The control circuit 20, in the return control, makes the position of the second hand 2 and the position corresponding to the internal time match each other while rotating the second hand 2 at the second rotational speed V2. The rotational direction of the second hand 2 in the return control is the clockwise rotational direction, which is the same as the rotational direction CW in the hand movement mode, for example. When the rotational position of the second hand 2 matches the position corresponding to the internal time, the control circuit 20 ends the return control to start the hand movement mode.

The following describes operation of the electronic watch 1 of the present embodiment with reference to a flowchart in FIG. 21. The flowchart in FIG. 21 is executed after the stop mode is started, for example. At Step S10, the control circuit 20 executes the stop mode. The control circuit 20 maintains the polarities of the respective electrodes 51, 52, and 53 of the electrostatic motor 11 to stop the second hand 2 through electrostatic forces. Upon execution of Step S10, the process advances to Step S20.

At Step S20, the control circuit 20 determines whether a minute digit has changed. The minute digit is a value of a digit indicating the current minute in the internal time and is an integer value of 0 to 59, for example. The control circuit 20 performs the determination at Step S20 based on the internal time. The control circuit 20, at Step S20, calculates the value of the minute digit of the internal time. If the calculated value of the minute digit is different from the value of the minute digit calculated at the previous Step S20, affirmative determination is made at Step S20. If affirmative determination that the minute digit has changed is made at Step S20, the process advances to Step S30; if negative determination is made, the process advances to Step S40.

At Step S30, the control circuit 20 moves the hour hand 4 and the minute hand 3 to positions of the current time. The control circuit 20 moves the hour hand 4 and the minute hand 3 to the positions corresponding to the current time by the electromagnetic motor 12. Upon execution of Step S30, the process advances to Step S40.

At Step S40, the control circuit 20 determines whether the return condition has been satisfied. The control circuit 20 performs the determination at Step S40 based on a detection result of a voltage detection circuit or a detection result of a current detection circuit, for example. If affirmative determination that the return condition has been satisfied is made by the determination at Step S40, the process advances to Step S50; if negative determination is made, the process shifts to Step S10.

At Step S50, the control circuit 20 instructs the electrostatic motor drive circuit 13 to rotate the second hand 2 with the frequency of the drive signal of the electrostatic motor 11 being the second frequency fr2. The electrostatic motor drive circuit 13 drives the electrostatic motor 11 at the second frequency fr2 until another instruction is issued. With this operation, the second hand 2 rotates at the second rotational speed V2. Upon execution of Step S50, the process advances to Step S60.

At Step S60, the control circuit 20 determines whether the minute digit has changed. If affirmative determination that the minute digit has changed is made by the determination at Step S60, the process advances to Step S70; if negative determination is made, the process advances to Step S80.

At Step S70, the control circuit 20 moves the hour hand 4 and the minute hand 3 to the positions of the current time. Upon execution of Step S70, the process advances to Step S80.

At Step S80, the control circuit 20 determines whether an indicated value including the second hand 2 matches the internal time. The control circuit 20 can acquire the indicated value of the second hand 2 based on the number of output pulses to the electrostatic motor 11 in the return control, for example. The control circuit 20 makes affirmative determination at Step S80 when the indicated value of the hour hand 4, the indicated value of the minute hand 3, and the indicated value of the second hand 2 all match the internal time. If affirmative determination is made at Step S80, the process advances to Step S90; if negative determination is made, the process shifts to Step S60.

At Step S90, the control circuit 20 instructs the electrostatic motor drive circuit 13 to start normal hand movement. The normal hand movement is hand movement rotating the second hand 2 with the frequency of the drive signal of the electrostatic motor 11 being the first frequency fr1. The electrostatic motor drive circuit 13 drives the electrostatic motor 11 at the first frequency fr1 to rotate the second hand 2 in the clockwise direction until another instruction is issued. Upon execution of Step S90, the process advances to Step S100.

At Step S100, the control circuit 20 determines whether the minute digit has changed. If affirmative determination that the minute digit has changed is made by the determination at Step S100, the process advances to Step S110; if negative determination is made, the present control flow ends.

At Step S110, the control circuit 20 moves the hour hand 4 and the minute hand 3 to the positions of the current time. Upon execution of Step S110, the present control flow ends.

The control circuit 20, in the return control, can also reduce the rotational speed of the second hand 2 by providing a suspension period in the drive signal in place of adjusting the frequency of the drive signal of the electrostatic motor 11. FIG. 22 illustrates another example of the drive signal of the electrostatic motor 11 in the return control. In the drive signal illustrated in FIG. 22, a drive period DA and a suspension period DS are alternately repeated. The length of the drive period DA and the length of the suspension period DS are each equal to the period P1. The drive period DA is a period during which the polarities of the electrodes 51, 52, and 53 change. In contrast, the suspension period DS is a period during which the polarities of the electrodes 51, 52, and 53 are maintained.

In the drive signal illustrated in FIG. 22, in the drive period DA, the drive pulse of the U phase, the drive pulse of the V phase, and the drive pulse of the W phase switch from on to off or from off to on with timings different from each other, for example. That is to say, in the drive period DA, a clockwise rotational force is imparted to the rotor 40 through the electrostatic attractive forces F1 and the electrostatic repulsive forces F2 generated by the electrodes 51, 52, and 53.

In contrast, in the suspension period DS, the drive pulse of the U phase and the drive pulse of the V phase are maintained off, whereas the drive pulse of the W phase is maintained on. In the suspension period DS, the second hand 2 rotates mainly through inertial force. The suspension period DS is provided in the drive signal, whereby the rotational speed of the second hand 2 in the return control is lower than the rotational speed of the second hand 2 in the hand movement mode.

In the case of FIG. 22, since a ratio of the drive period DA and the suspension period DS is 1:1, the rotational speed of the second hand 2 in the return control is twice relative to the rotational speed of the second hand 2 in the hand movement mode. However, it is possible to change the ratio arbitrarily to make the rotational speed of the second hand 2 in the return control other than twice relative to the rotational speed of the second hand 2 in the hand movement mode. For example, when the ratio of the drive period DA and the suspension period DS is 2:1, the rotational speed of the second hand 2 in the return control is ⅔ times relative to the rotational speed of the second hand 2 in the hand movement mode.

The following describes changes in the internal time and the display time in the return control with reference to FIG. 23. The display time is a time displayed by the hour hand 4, the minute hand 3, and the second hand 2. In the stop mode, the second hand 2 is stationary at the position on the hour. When the return condition is satisfied, and the internal time becomes 11:30:31, the return control is started. The control circuit 20, in the return control, rotates the second hand 2 clockwise at the second rotational speed V2. When the internal time becomes 11:30:59, the display time is 11:30:14. At this point of time, the display time is 45 seconds behind the internal time.

When the internal time becomes 11:31:00, only the minute hand and the hour hand are in synchronized with the current time, and the display time is 11:31:15. The display time is 15 seconds ahead of the internal time. When the internal time becomes 11:31:30, the display time matches the internal time. When the display time matches the internal time, the control circuit 20 ends the return control to start the hand movement mode. The control circuit 20 changes the rotational speed of the second hand 2 to the first rotational speed V1 from the second rotational speed V2 to move the second hand 2.

The electronic watch 1 of the present embodiment makes the rotational speed of the second hand 2 in the return control lower than the rotational speed of the second hand 2 in the hand movement mode. Consequently, when looking at the electronic watch 1 during execution of the return control, the user easily notices that the second hand 2 is in motion differently from the hand movement mode. Consequently, the user can be caused to recognize that the position of the second hand 2 is different from a position of the internal time. In addition, the rotational speed of the second hand 2 is made to be the second rotational speed V2 in the return control, whereby power consumption in the return control is reduced.

The control circuit 20, in the return control, may rotate the second hand 2 in the counterclockwise direction. The rotational speed of the second hand 2 in this process is the second rotational speed V2, for example. When the display time matches the internal time, the control circuit 20 switches the rotational direction of the second hand 2 to start the hand movement mode. FIG. 24 illustrates an example of the drive signal of the electrostatic motor 11 in the return control. In the drive signal in FIG. 24, the drive pulse of the V phase follows the drive pulse of the W phase with a phase difference Δu. Furthermore, the drive pulse of the U phase follows the drive pulse of the V phase with a phase difference Δu. With this drive signal, the rotor 40 rotates in a direction opposite to the rotational direction CW. The period P2 of the drive signal is double the period P1 in the hand movement mode. Consequently, the second hand 2 rotates at a speed ½ of the first rotational speed V1.

The following describes operation of the electronic watch 1 according to the third embodiment with reference to FIG. 25. In FIG. 25, Step S210 to Step S240 are similar to Step S10 to Step S40 of the flowchart illustrated in FIG. 21. That is to say, the control circuit 20 executes the stop mode (Step S210) and, if the minute digit has changed (Yes at Step S220), moves the hour hand 4 and the minute hand 3 to the current time (Step S230). If the return condition is satisfied (Yes at Step S240), the control circuit 20 advances to Step S250.

At Step S250, the control circuit 20 starts backward hand movement of the second hand 2. The control circuit 20 exerts a rotational force in a direction opposite to the rotational direction CW on the rotor 40 through a drive signal output from the electrostatic motor drive circuit 13. The frequency of the drive signal in this process is the second frequency fr2. Consequently, the second hand 2 rotates backward at the second rotational speed V2. Upon execution of Step S250, the process advances to Step S260.

Step S260 to Step S280 are similar to Step S60 to Step S80 of the flowchart illustrated in FIG. 21. That is to say, if the minute digit has changed (Yes at Step S260), the control circuit 20 moves the hour hand 4 and the minute hand 3 to the positions of the current time (Step S270). At Step S280, the control circuit 20 determines whether an indicated value including the second hand 2 matches the internal time. If affirmative determination is made (Yes at Step S280), the process advances to Step S290; if negative determination is made, the process shifts to Step S260.

At Step S290, the control circuit 20 instructs the electrostatic motor drive circuit 13 to rotate the second hand 2 in the rotational direction CW with the frequency of the drive signal of the electrostatic motor 11 being the first frequency fr1. With this operation, the hand movement mode is started. Upon execution of Step S290, the process advances to Step S300.

At Step S300, the control circuit 20 determines whether the minute digit has changed. If affirmative determination that the minute digit has changed is made by the determination at Step S300, the process advances to Step S310; if negative determination is made, the present control flow ends.

At Step S310, the control circuit 20 moves the hour hand 4 and the minute hand 3 to the positions of the current time. Upon execution of Step S310, the present control flow ends.

The following describes changes in the internal time and the display time in the return control in FIG. 25 with reference to FIG. 26. In the stop mode, the second hand 2 is stationary at the position on the hour. When the return condition is satisfied, and the internal time becomes 11:30:

30, the return condition is started. At this point of time, the display time is 30 seconds behind the internal time. The control circuit 20, in the return control, rotates the second hand 2 counterclockwise at the second rotational speed V2. When the internal time becomes 11:30:40, the display time is 11:30:55. At this point of time, the display time is 15 seconds ahead of the internal time.

When the internal time becomes 11:30:50, the display time and the internal time match each other. The control circuit 20 reverses the rotational direction of the second hand 2 and changes the rotational speed of the second hand 2 to the first rotational speed V1 from the second rotational speed V2 to move the second hand 2. With this operation, the normal hand movement is resumed.

The control circuit 20, in the return control, may reduce the rotational speed of the second hand 2 by providing a suspension period in the drive signal of the electrostatic motor 11. In the drive signal illustrated in FIG. 27, the drive period DA and the suspension period DS are alternately repeated. The length of the drive period DA and the length of the suspension period DS are each equal to the period P1. The drive pulse of the V phase follows the drive pulse of the W phase with a phase difference Δt. Furthermore, the drive pulse of the U phase follows the drive pulse of the V phase with a phase difference Δt. In contrast, in the suspension period DS, the polarities of the electrodes 51, 52, and 53 are maintained.

Figure 28:
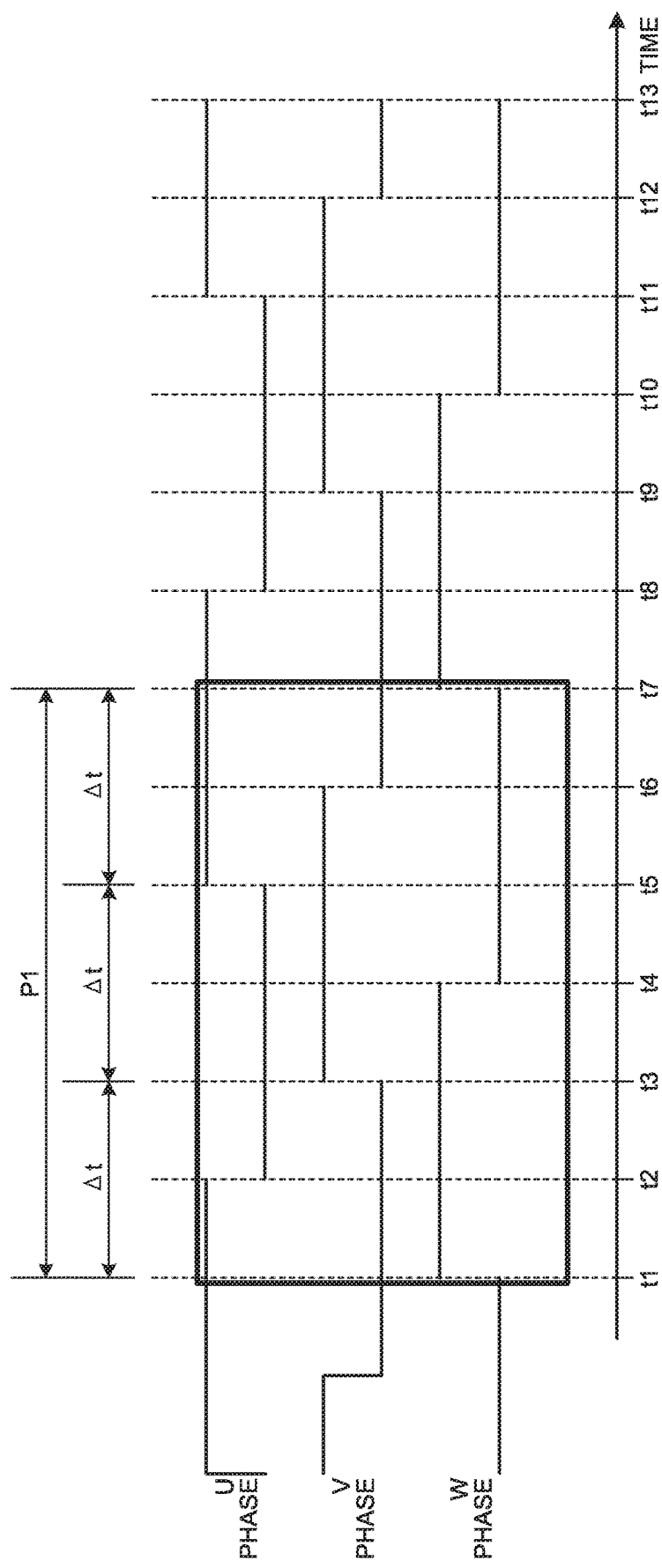
FIG. 28 is a diagram of the drive signal when a second hand is rotated backward at a first rotational speed.

In the return control of the third embodiment, the second hand 2 may be rotated backward at the first rotational speed V1 in accordance with situations or the like. The second hand 2 may be rotated backward at the first rotational speed V1 when the difference between the internal time and the display time at the start of the return control is small, for example. With this operation, the display time can be quickly made to match the internal time. FIG. 28 illustrates a drive signal when the second hand 2 is rotated backward at the first rotational speed V1. The drive signal illustrated in FIG. 28 takes the period P1 to complete a full cycle of the three-phase drive pulses. The order of drive is the order of the W phase, the V phase, and the U phase.

The control circuit 20, at the end of the return control, may temporarily stop the second hand 2 and then make a transition to the hand movement mode. The control circuit 20 temporarily stops the second hand 2 before the position of the second hand 2 and the position corresponding to the internal time match each other, for example. When the position of the second hand 2 and the position corresponding to the internal time match each other, the control circuit 20 starts the hand movement mode. When the rotational direction of the second hand 2 is reversed, the rotation of the second hand 2 is temporarily stopped, whereby the occurrence of a loss of synchronization in the electrostatic motor 11 can be inhibited.

The control circuit 20 may determine the rotational direction of the second hand 2 in the return control based on the difference between the internal time and the display time at the start of the return control. As an example, the control circuit 20 may determine the rotational direction of the second hand 2 such that the required time for completing the return to the hand movement mode (hereinafter, referred to simply as "the required time") becomes shorter. The required time is a time required until completion of the transition to the hand movement mode after start of the return control, for example.

The electronic watch 1 may have a mode different from any of the hand movement mode and the stop mode. The electronic watch 1 may have a power break mode, which stops all the second hand 2, the minute hand 3, and the hour hand 4, for example. The power break mode is executed when the voltage of the power source 17 lowers, for example. In this case, the control circuit 20 selectively executes the hand movement mode or the stop mode when the voltage of the power source 17 does not lower.

The third embodiment can also be applied to another return control for making the display time match the internal time. When the display time is made to match the internal time from a state in which the hour hand 4, the minute hand 3, and the second hand 2 are all stationary, the second hand 2 may be rotated at the second rotational speed V2, or the second hand 2 may be rotated backward, for example. The hour hand 4 and the minute hand 3 may be moved to positions of the internal time by fast-forwarding.

The motor driving the second hand 2 may be a motor of a drive system different from the electrostatic motor 11 and may be an electromagnetic motor, for example. The motor driving the minute hand 3 and the hour hand 4 may be a motor of a drive system different from the electromagnetic motor 12 and may be an electrostatic motor, for example. It is noted that the motor for the second hand 2 is an electrostatic motor, although it is higher in power consumption, and the motor for the minute hand 3 and the hour hand 4 is a conventional step motor, which is intermittently driven and is lower in power consumption, whereby a watch having high commercial value can be provided by reducing power consumption in the stop mode and performing the sweep hand movement in the hand movement mode.

When returning to the hand movement mode from the stop mode as above, the second hand 2 can rotate at the second rotational speed V2, which is lower than the first rotational speed V1 in the hand movement mode, to return to the current time. Consequently, the second hand 2 is driven at a high rotational speed close to a limiting rotational speed of the electrostatic motor 11, whereby second hand movement with finer rotational motion of 1 second what is called sweep hand movement can be expressed.

To cause the user to recognize that the position of the second hand 2 is in the midst of being corrected, moving the speed of the hand at a speed different from that of the normal hand movement mode is effective. The electrostatic motor 11, in its driving principle, is lower in limiting rotational speed than the electromagnetic motor 12. Consequently, the second hand 2 is rotated at a speed lower than that of the normal hand movement mode or is rotated backward, although at the same speed as that of the hand movement mode, thereby enabling the user to recognize that the second hand 2 is in the midst of correcting its position.

As described above, in the electronic watch 1 of the third embodiment, the control circuit 20 rotates the second hand 2 at the second rotational speed V2 or rotates the second hand 2 backward to make the position of the second hand and the position corresponding to the internal time match each other. The second rotational speed V2 is a speed lower than the first rotational speed V1, which is the rotational speed of the second hand 2 in the hand movement mode. The second hand 2 is rotating at the second rotational speed V2, or the second hand 2 is rotating backward, thereby enabling the user to easily recognize that the second hand 2 is in the midst of correcting its position.

In the present embodiment, the frequency of the drive signal of the electrostatic motor 11 in the hand movement mode is the first frequency fr1, which is larger than 1 [Hz]. The first frequency fr1 is larger than 1 [Hz], whereby hand movement of the second hand 2 is the sweep hand movement or continuous hand movement equivalent to the sweep hand movement. When returning to the hand movement mode from the stop mode, the control circuit 20 makes the frequency of the drive signal of the electrostatic motor 11 the second frequency fr2, which has a longer cycle than that of the first frequency fr1, to reduce the rotational speed of the second hand 2. The electrostatic motor 11 is driven by the periodic drive signal, whereby fluctuations in the rotational speed of the second hand 2 are hard to occur. When returning to the hand movement mode from the stop mode, the control circuit 20 may reduce the rotational speed of the second hand 2 by providing the suspension period DS in the drive signal of the electrostatic motor 11.

The control circuit 20, at the end of the return control, may temporarily stop the second hand 2 and then make a transition to the hand movement mode. The control circuit 20 temporarily stops the second hand 2 before the position of the second hand 2 and the position corresponding to the internal time match each other, for example. When the position of the second hand 2 and the position corresponding to the internal time match each other, the control circuit 20 starts the hand movement mode. The second hand 2 is stopped, and then the hand movement mode is started, whereby the occurrence of a loss of synchronization in the electrostatic motor 11 can be inhibited.

First Modification of Embodiments

Figure 29:
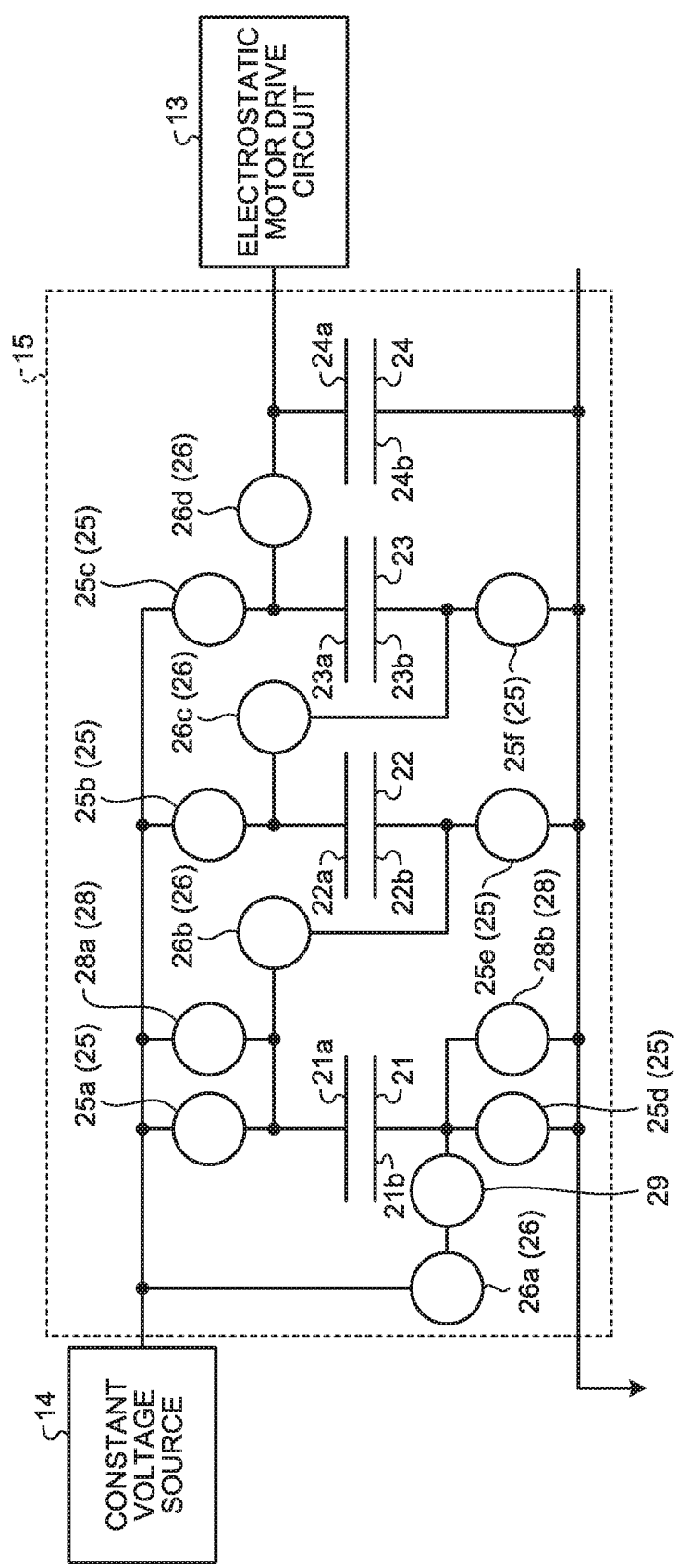
FIG. 29 is a diagram of a booster circuit according to a first modification of the embodiments.
Figure 30:
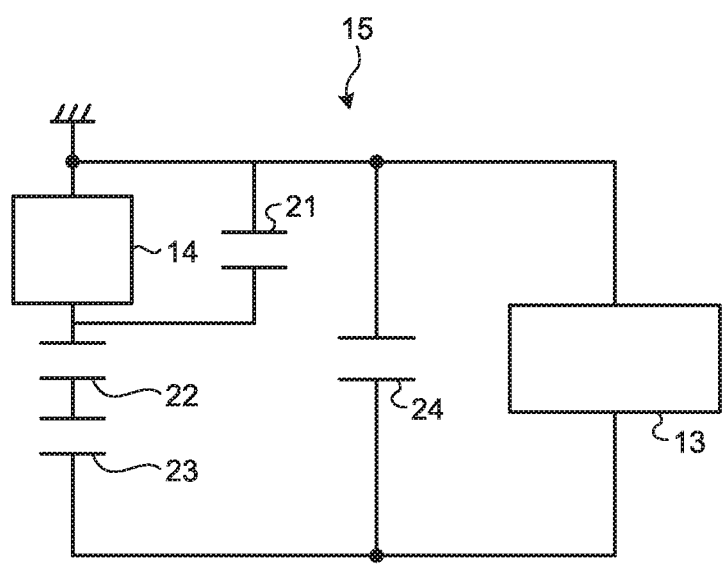
FIG. 30 is a diagram illustrating a boosting operation in the booster circuit of the first modification of the embodiments.

The following describes a first modification of the first embodiment, the second embodiment, and the third embodiment. FIG. 29 is a diagram of the booster circuit according to the first modification of the embodiments, and FIG. 30 is a diagram illustrating a boosting operation in the booster circuit of the first modification of the embodiments. A different point in the booster circuit 15 according to the first modification of the embodiments from the booster circuit 15 of the first embodiment is that the former has a fourth switch 28 and a fifth switch 29.

The booster circuit 15 has two switches 28a and 28b as the fourth switch 28. The switch 28a is a switch connecting and disconnecting the output of the constant voltage source 14 and the first electrode 21a of the first capacitor 21. The switch 28b is a switch connecting and disconnecting the second electrode 21b of the first capacitor 21 and the second electrode 24b of the fourth capacitor 24. The fifth switch 29 is a switch connecting and disconnecting the switch 26a and the second electrode 21b of the first capacitor 21. In the hand movement mode, the fourth switch 28 is turned off, and the fifth switch 29 is turned on. In this case, the first switch 25 is turned on, and the second switch 26 is turned off, thereby making the booster circuit 15 a circuit equivalent to the circuit illustrated in FIG. 7. The first switch 25 is turned off, and the second switch 26 is turned on, thereby making the booster circuit 15 a circuit equivalent to the circuit illustrated in FIG. 8.

In the stop mode, in contrast, the fourth switch 28 is turned on, and the fifth switch 29 is turned off. In this case, the first switch 25 is turned on, and the second switch 26 is turned off, thereby making the booster circuit 15 a circuit equivalent to the circuit illustrated in FIG. 7. The first switch 25 is turned off, and the second switch 26 is turned on, thereby making the booster circuit 15 a circuit equivalent to the circuit illustrated in FIG. 30. In the circuit illustrated in FIG. 30, the second capacitor 22 and the third capacitor 23 are connected in series to the constant voltage source 14. The first capacitor 21 is connected in parallel to the constant voltage source 14. Consequently, the voltage of the constant voltage source 14 is boosted three times, which is stored in the fourth capacitor 24. That is to say, in accordance with on/off of the fourth switch 28 and the fifth switch 29, a boosting ratio in the booster circuit 15 switches between three times and four times.

The control circuit 20 of the present modification makes the boosting ratio of the booster circuit 15 in the hand movement mode four times and makes the boosting ratio of the booster circuit 15 in the stop mode three times. That is to say, the control circuit 20 makes the boosting ratio of the booster circuit 15 in the stop mode lower than the boosting ratio of the booster circuit 15 in the hand movement mode. The boosting ratio in the stop mode is made to be lower, whereby the through current also reduces in proportion to the voltage, and the power consumption of the booster circuit 15 in the stop mode is reduced.

The ratio between the boosting ratio of the hand movement mode and the boosting ratio of the stop mode is not limited to the exemplified ratio; the boosting ratio of the stop mode may be half or ⅓ of the boosting ratio of the hand movement mode, for example.

The boosting ratio of the booster circuit 15 in the hand movement mode may be changed according to the rotational speed of the second hand 2. Specifically, the control circuit 20 makes the boosting ratio of the booster circuit 15 in the hand movement mode at the first rotational speed V1 of the second hand 2 four times, and makes the boosting ratio of the booster circuit 15 at the second rotational speed V2 of the second hand 2 three times. With this operation, since the voltage of the drive pulse is low, the limiting rotational speed of the rotor 40 to follow the drive pulse without accompanying a loss of synchronization is lowered. However, the drive of the rotor 40 can be established because the frequency of the drive signal of the electrostatic motor 11 is low such as at the second rotational speed V2 of the second hand 2 as illustrated in FIG. 20 and FIG. 24, whereby the power consumption of the booster circuit 15 can be reduced.

Second Modification of Embodiments

Figure 31:
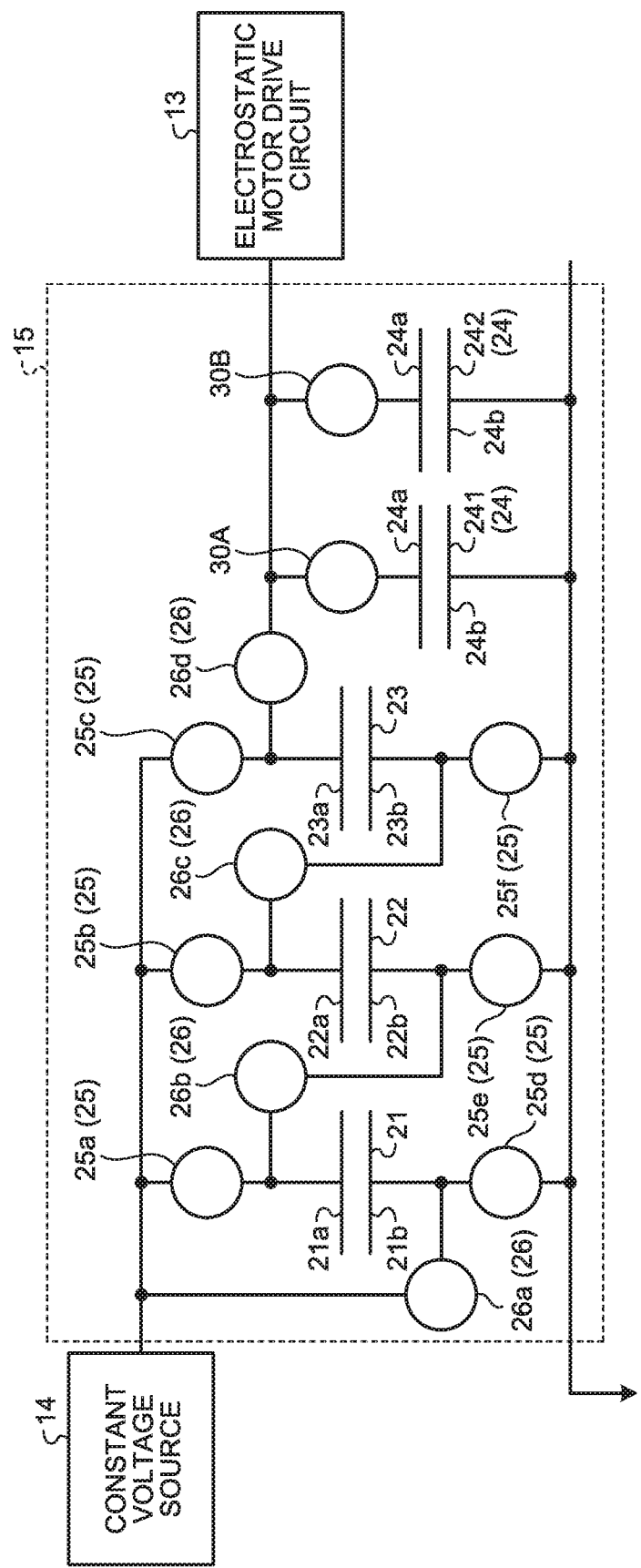
FIG. 31 is a diagram of the booster circuit according to a second modification of the embodiments.

The following describes a second modification of the first embodiment, the second embodiment, and the third embodiment. FIG. 31 is a diagram of the booster circuit according to the second modification of the embodiments. The booster circuit 15 of the second modification can switch a capacitor that stores the boosted voltage. The booster circuit 15 of the second modification has two capacitors 241 and 242 as the fourth capacitor 24. The two capacitors 241 and 242 are connected in parallel to each other. The capacitance of one capacitor 241 is larger than the capacitance of the other capacitor 242. The booster circuit 15 has a sixth switch 30A and a seventh switch 30B. The sixth switch 30A connects and disconnects the first electrode 24a of the one capacitor 241 and the switch 26d and the electrostatic motor drive circuit 13. The seventh switch 30B connects and disconnects the first electrode 24a of the other capacitor 242 and the switch 26d and the electrostatic motor drive circuit 13. The booster circuit 15, in the hand movement mode, turns on the sixth switch 30A and turns off the seventh switch 30B. With this operation, the boosted voltage is stored in the one capacitor 241. The booster circuit 15, in the stop mode, turns off the sixth switch 30A and turns on the seventh switch 30B. With this operation, the boosted voltage is stored in the other capacitor 242.

In the stop mode, the boosted voltage is stored in the capacitor 242, which is smaller in capacitance, whereby losses caused by a leak of electric charges and the like can be reduced. Consequently, the booster circuit 15 of the second modification can reduce the power consumption in the stop mode.

Third Modification of Embodiments

The following describes a third modification of the first embodiment, the second embodiment, and the third embodiment. The electret films 42 may be charged at plus potential. In this case, in the stop mode, the counter electrodes are negative electrodes, whereas the adjacent electrodes are positive electrodes.

The combination of the polarity of the counter electrodes and the polarity of the adjacent electrodes is not limited to the exemplified combination. That is to say, it is only required that the polarities and the magnitude of potential of the counter electrodes and the adjacent electrodes are set as appropriate such that electrostatic forces keeping the rotor 40 stationary can be generated.

Fourth Modification of Embodiments

The hand driven by the electrostatic motor 11 is not limited to the second hand 2. The hand driven by the electrostatic motor 11 may be a hand for a chronograph. In this case, while a chronograph function is not used, the hand for a chronograph is stopped by the electrostatic motor 11. That is to say, a control mode when the chronograph function is not used corresponds to the stop mode. A control mode when the chronograph function is used corresponds to the hand movement mode.

The electronic watch 1 may drive the minute hand 3 and the hour hand 4 by the electrostatic motor 11 in addition to the second hand 2. In this case, in the stop mode, the minute hand 3 and the hour hand 4 are stopped in addition to the second hand 2.

The electronic watch 1 may drive the minute hand 3 and the hour hand 4 by a second electrostatic motor in place of the electromagnetic motor 12. In this case, the control circuit 20, in the stop mode, moves the minute hand 3 and the hour hand 4 by the second electrostatic motor and stops the electrostatic motor 11.

The details disclosed in the embodiments and the modifications can be performed in an appropriately combined manner. In the electronic watch 1 of the first embodiment, in the stop mode, boosting by the booster circuit 15 may be stopped to supply voltage that is equal to or lower than the voltage of the power source 17 to the electrostatic motor 11, for example. In the electronic watch 1 of the first embodiment, the boosting ratio of the stop mode may be made lower than the boosting ratio of the hand movement mode. In the electronic watch 1 of the second embodiment, the number of boosting clocks of the booster circuit 15 in the stop mode may be made lower than the number of boosting clocks thereof of the hand movement mode.

The electronic watch according to the present embodiments includes a power source, an electrostatic motor including a rotor in which a plurality of electret films are arranged in a rotational direction and a plurality of fixed electrodes arranged in the rotational direction at positions facing the rotor, a hand rotating in conjunction with rotation of the rotor, and a motor control circuit controlling the electrostatic motor.

The motor control circuit selectively executes a hand movement mode for rotating the hand and a stop mode for keeping the hand stationary. In the stop mode, the motor control circuit keeps the rotor stationary through electrostatic forces exerted on the electret films from the fixed electrodes with the polarities of the fixed electrodes maintained. The electronic watch according to the present embodiments produces an effect of making it possible to keep the hand stationary while reducing power consumption by keeping the rotor stationary through the electrostatic forces with the polarities of the fixed electrodes maintained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic watch comprising:
a power source;
an electrostatic motor including a rotor in which a plurality of electret films are arranged in a rotational direction and a plurality of fixed electrodes arranged in the rotational direction at positions facing the rotor;
a hand configured to rotate in conjunction with rotation of the rotor; and
a motor control circuit configured to control the electrostatic motor, wherein
the motor control circuit selectively executes a hand movement mode for rotating the hand and a stop mode for keeping the hand stationary,
in the stop mode, the motor control circuit keeps the rotor stationary through electrostatic forces exerted on the electret films from the fixed electrodes with polarities of the fixed electrodes maintained,
the hand rotating in conjunction with rotation of the rotor is a second hand, and
when returning to the hand movement mode from the stop mode, the motor control circuit rotates the second hand at a speed lower than a speed in the hand movement mode or rotates the second hand backward to make a position of the second hand and a position corresponding to an internal time match each other.

2. The electronic watch according to claim 1, wherein
in the stop mode, the motor control circuit exerts electrostatic attractive forces on the electret films by counter electrodes as the fixed electrodes facing central parts of the electret films.

3. The electronic watch according to claim 1, wherein
the fixed electrodes are configured to include counter electrodes facing central parts of the electret films and adjacent electrodes adjacent to the counter electrodes, and
in the stop mode, the motor control circuit exerts electrostatic repulsive forces on the electret films by the adjacent electrodes as the fixed electrodes adjacent to the counter electrodes.

4. The electronic watch according to claim 1, further comprising:
a booster circuit configured to boost voltage of the power source and supply the voltage to the electrostatic motor; and
a voltage control circuit configured to control the booster circuit, wherein
the voltage control circuit, in the stop mode, reduces power consumption of the booster circuit compared with power consumption of the booster circuit in the hand movement mode.

5. The electronic watch according to claim 4, wherein the voltage control circuit makes a boosting ratio of the booster circuit in the stop mode lower than a boosting ratio of the booster circuit in the hand movement mode.

6. The electronic watch according to claim 4, wherein the voltage control circuit stops boosting by the booster circuit in the stop mode to supply voltage equal to or lower than the voltage of the power source to the electrostatic motor.

7. The electronic watch according to claim 1, wherein a frequency of a drive signal of the electrostatic motor in the hand movement mode is a first frequency larger than 1 Hz, and when returning to the hand movement mode from the stop mode, the motor control circuit makes the frequency of the drive signal of the electrostatic motor a second frequency having a longer cycle than that of the first frequency, to reduce a rotational speed of the second hand.

8. The electronic watch according to claim 1, wherein when returning to the hand movement mode from the stop mode, the motor control circuit sets a suspension period in the drive signal of the electrostatic motor to reduce a rotational speed of the second hand.

9. The electronic watch according to claim 1, wherein when returning to the hand movement mode from the stop mode, the motor control circuit rotates the second hand in a rotational direction in which a required time for completing a return to the hand movement mode becomes shorter.

10. The electronic watch according to claim 1, wherein when returning to the hand movement mode from the stop mode, the motor control circuit temporarily stops the second hand before the position of the second hand and the position corresponding to the internal time match each other, and starts the hand movement mode when the position of the second hand and the position corresponding to the internal time match each other.

11. The electronic watch according to claim 1, further comprising:
    an hour hand;
    a minute hand; and
    an electromagnetic motor configured to drive the hour hand and the minute hand, wherein
    the hand rotating in conjunction with rotation of the rotor is a second hand, and
    in the stop mode, the hour hand and the minute hand are driven by the electromagnetic motor, and rotation of the second hand is stopped.

* * * * *